US009041958B2

(12) United States Patent
Kishimoto et al.

(10) Patent No.: US 9,041,958 B2
(45) Date of Patent: May 26, 2015

(54) NON-TRANSITORY COMPUTER READABLE STORAGE MEDIUM STORING DISTRIBUTED PRINTING CONTROL PROGRAM

(71) Applicants: Kazuhisa Kishimoto, Mitaka (JP); Yasuyuki Kamai, Toshima-ku (JP)

(72) Inventors: Kazuhisa Kishimoto, Mitaka (JP); Yasuyuki Kamai, Toshima-ku (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 9 days.

(21) Appl. No.: 13/717,035

(22) Filed: Dec. 17, 2012

(65) Prior Publication Data

US 2013/0162713 A1 Jun. 27, 2013

(30) Foreign Application Priority Data

Dec. 21, 2011 (JP) ................................ 2011-279083

(51) Int. Cl.

| | |
|---|---|
| ***G06F 15/00*** | (2006.01) |
| ***G06K 1/00*** | (2006.01) |
| ***G06F 3/12*** | (2006.01) |
| ***B41J 11/00*** | (2006.01) |
| ***B41J 13/00*** | (2006.01) |
| ***G03G 15/00*** | (2006.01) |

(52) U.S. Cl.

CPC ............ *B41J 11/008* (2013.01); *B41J 13/0036* (2013.01); *G03G 15/5083* (2013.01)

(58) Field of Classification Search

None

See application file for complete search history.

(56) References Cited

U.S. PATENT DOCUMENTS 6,496,278 B1 * 12/2002 Tamura et al. ............... 358/1.16
2001/0048833 A1 12/2001 Katsuda
2002/0041392 A1 * 4/2002 Tokura ......................... 358/1.15
2003/0197882 A1 * 10/2003 Tsukuba et al. ............. 358/1.12
2005/0185222 A1 * 8/2005 Sammis et al. ................ 358/2.1
2006/0192982 A1 * 8/2006 Ogasawara ..................... 358/1.9
2006/0274331 A1 * 12/2006 Kawasaki ...................... 358/1.1
2008/0277866 A1 * 11/2008 Moriyama et al. ............ 271/279
2009/0021783 A1 * 1/2009 Hosokawa ..................... 358/1.15
2009/0106380 A1 * 4/2009 Asthana et al. ............... 709/206
2010/0097624 A1 * 4/2010 Hirakawa ...................... 358/1.12

FOREIGN PATENT DOCUMENTS

JP 11-116129 A 4/1999
JP 2001-344083 A 12/2001
JP 2004-205846 A 7/2004
JP 2009-292580 A 12/2009

OTHER PUBLICATIONS

Japanese Office Action (Notification of Reason(s) for Refusal) dated Jan. 21, 2014, issued by the Japanese Patent Office in corresponding Japanese Patent Application No. 2011-279083 and English language translation. (6 pages).

* cited by examiner

*Primary Examiner* — Ming Hon

(74) *Attorney, Agent, or Firm* — Buchanan Ingersoll & Rooney PC

(57) ABSTRACT

A non-transitory computer readable storage medium stores therein a distributed printing control program executed in a system to perform distributed printing by outputting a specified number of sets of paper sheets by using plural image forming apparatuses, where the number of the sets is instructed by a job. The program causes an apparatus belonging to the system to function as a control section. The control section divides the job into plural jobs, where each of the jobs causes one of the image forming apparatuses to eject plural sets of paper sheets shifted in alternate directions such that, when sets of paper sheets ejected by the plural image forming apparatuses are stacked up together, all the sets of paper sheets are shifted in alternate directions to enable each of the sets to be separated from others. The control section further subjects the divided jobs to the plural image forming apparatuses.

21 Claims, 21 Drawing Sheets

FIG. 17

DISTRIBUTED PRINTING
MESSAGE SHEET

FOR STACKING OUTPUTS OF DISTRIBUTED PRINTING TOGETHER, PUT SETS OF PAPER SHEETS OF THIS MACHINE ON THE TOP OF OTHER SETS.

IT ADJUSTS PAPER-SHIFT DIRECTION.

FIG. 18

DISTRIBUTED PRINTING
MESSAGE SHEET

FOR STACKING OUTPUTS OF DISTRIBUTED PRINTING TOGETHER, ROTATE SETS OF PAPER SHEETS OF THIS MACHINE THROUGH 180 DEGREES TO ADJUST ORIENTATION OF IMAGES TO THOSE OF OTHER SETS.

IT ADJUSTS PAPER-SHIFT DIRECTION.

NON-TRANSITORY COMPUTER READABLE STORAGE MEDIUM STORING DISTRIBUTED PRINTING CONTROL PROGRAM

This application is based on Japanese Patent Application No. 2011-279083 filed on Dec. 21, 2011, in Japanese Patent Office, the entire content of which is hereby incorporated by reference.

TECHNICAL FIELD

The present invention relates to a non-transitory computer readable storage medium storing a distributed printing control program wherein a print process is performed by plural image forming apparatuses. Especially, the present invention relates to a non-transitory computer readable storage medium storing a distributed printing control program for controlling a shift direction of sheets of paper outputted from the plural image forming apparatuses in a distributed printing process.

BACKGROUND

In recent years, there have been proposed distributed printing techniques in order to process a large amount of print jobs in an office having plural image forming apparatuses. Further, in order to reduce effort of sorting operations under the condition that a large amount of sets of printed materials were made, there has been used an image forming apparatus having a paper-shift function. This paper-shift function is a function of ejecting sheets of paper so as to stack up the sheets one by one with the sheets shifted in alternate directions perpendicular to the paper ejecting direction, which is effective for the situation that the ejected outputs are separately distributed to people.

As an example of a paper-shift function, JP-A No. H11-116129 discloses a printing apparatus having the following structure. The printing apparatus includes plural paper-ejection slots for ejecting printed recording media, and a paper-ejecting unit for ejecting recording media to any one of the paper ejection slots, wherein on the recording media, printing is performed based on image information transmitted from an information processing apparatus through a prescribed communication medium. The printing apparatus further includes a paper-shift unit for performing paper-shift ejection to shift the position where recording medium ejected from the paper ejecting unit is put, in a predetermined direction. The printing apparatus further includes a first judging unit, a storing unit, a second judging unit and a control unit. The first judging unit judges whether the paper-shift ejection has been set in an outputting job or not. The storing unit stores the condition of paper-shift ejection of each paper-ejection slot. The second judging unit judges whether a recording medium which has been outputted under the paper-shift ejection is placed on each of the paper-ejecting slots or not, based on the condition of paper-shift ejection in each paper-ejection slot, which has been stored in the storing unit. The control unit controls the paper-ejection to eject an output of a job in which paper-shift ejection has been set and an output of a job in which paper-shift ejection has not been set, separately to different paper-ejection slots, based on the judging results of the first judging unit and the second judging unit.

However, when the distributed printing is carried out with plural image forming apparatuses each having a paper-shift function, there can be caused a situation that sheets of paper are the same in size but are different in their orientation and it makes piling up the gathered sets of paper sheets difficult.

Further, there can be caused a situation that piling up the gathered sets of paper sheets makes the boundary of the sets unclear in case that the last-printed set of paper sheets in one image forming apparatus and the first-printed set of paper sheets in another image forming apparatus are shifted in the same direction.

SUMMARY

There will be disclosed an illustrative non-transitory computer readable storage medium storing therein a distributed printing control program, as an embodiment of the present invention to solve at least one of the above problems.

A non-transitory computer readable storage medium reflecting one aspect of the present invention is a non-transitory computer readable storage medium storing therein a distributed printing control program. The program is executed in a system to perform distributed printing by outputting a specified number of sets of paper sheets by using a plurality of image forming apparatuses, where the number of the sets is instructed by a job. The program causes an apparatus belonging to the system to function as a control section. The control section divides the job into a plurality of jobs. Each of the jobs causes one of the image forming apparatuses to eject a plurality of sets of paper sheets shifted in alternate directions such that, when sets of paper sheets ejected by the plurality of image forming apparatuses are stacked up together, all the sets of paper sheets are shifted in alternate directions to enable each of the sets to be separated from others. Further, the control section subjects the divided jobs to the plurality of image forming apparatuses.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

Figure 5A:
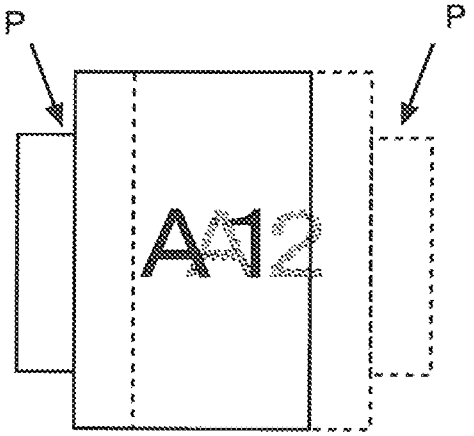
FIG. 5A Related Art
Figure 5B:
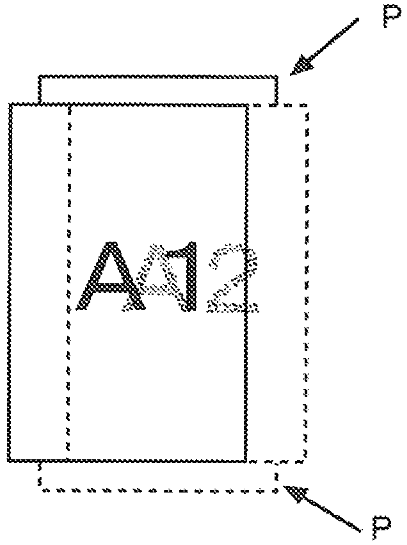
FIG. 5B Related Art
Figure 6A:
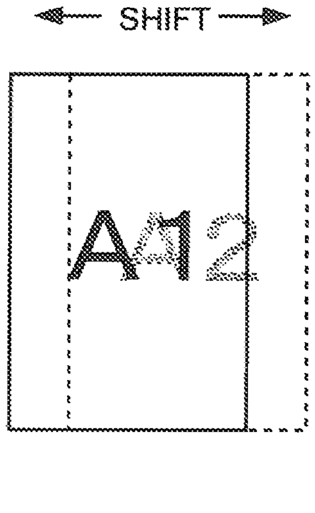
Figure 6B:
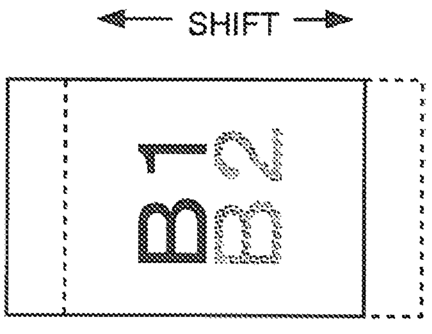
Figure 7A:
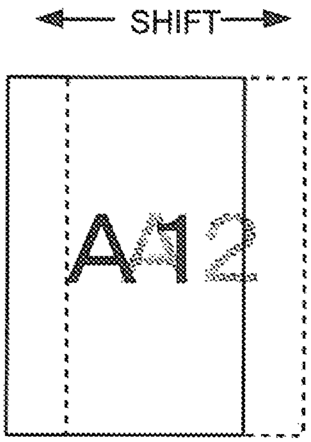
Figure 7B:
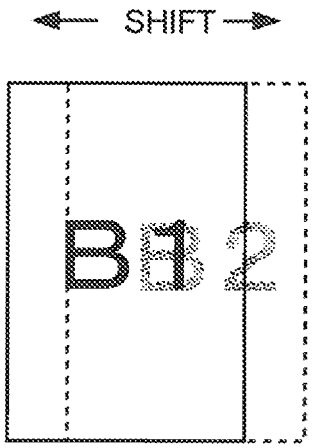
Figure 8A:
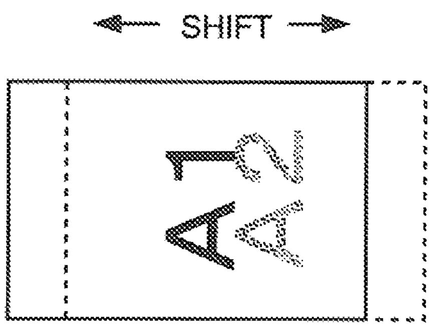
Figure 8B:
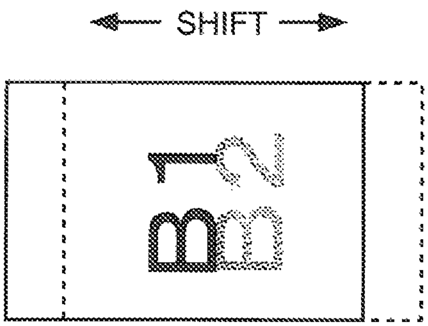
Figure 9:
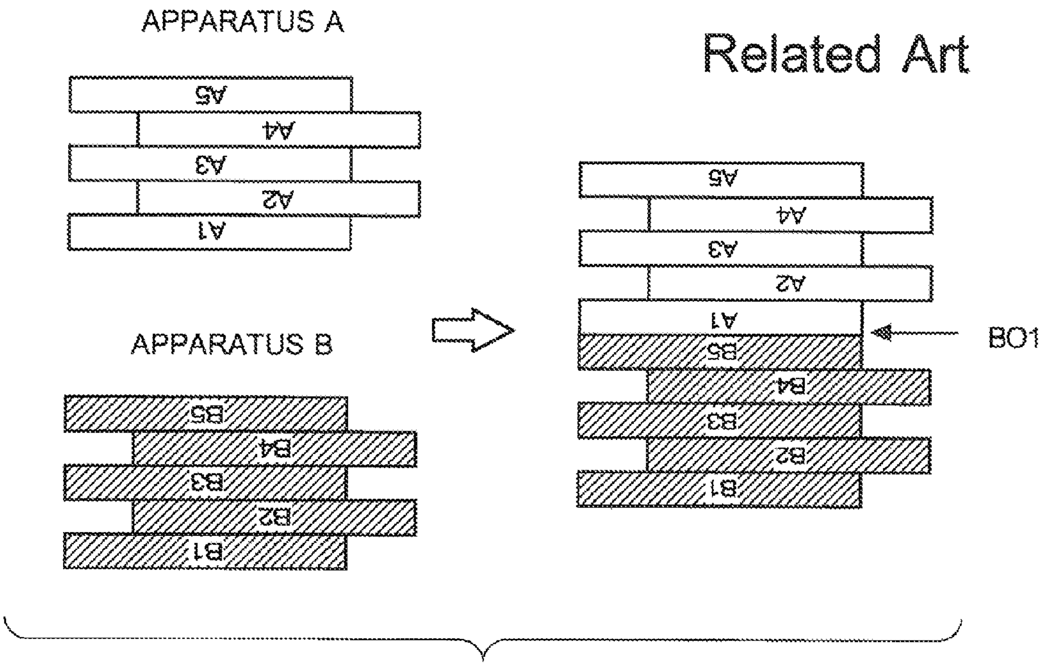
Figure 10:
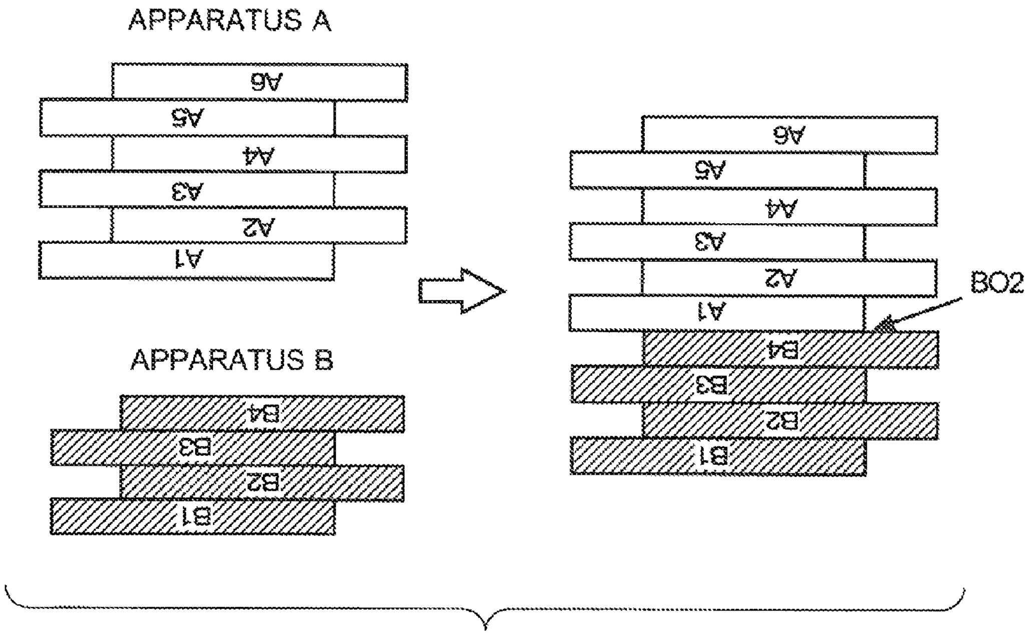
Figure 11:
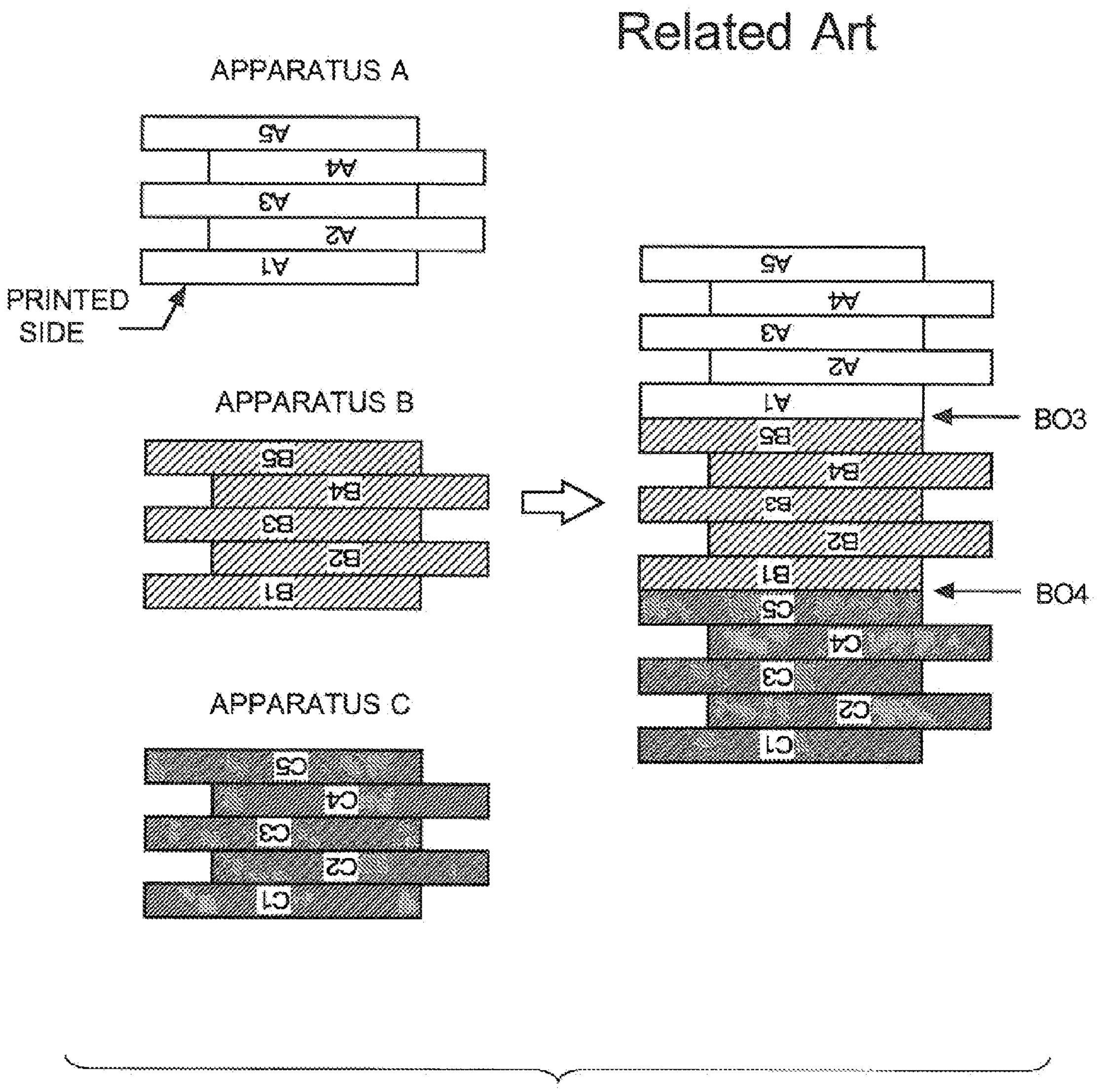
Figure 12:
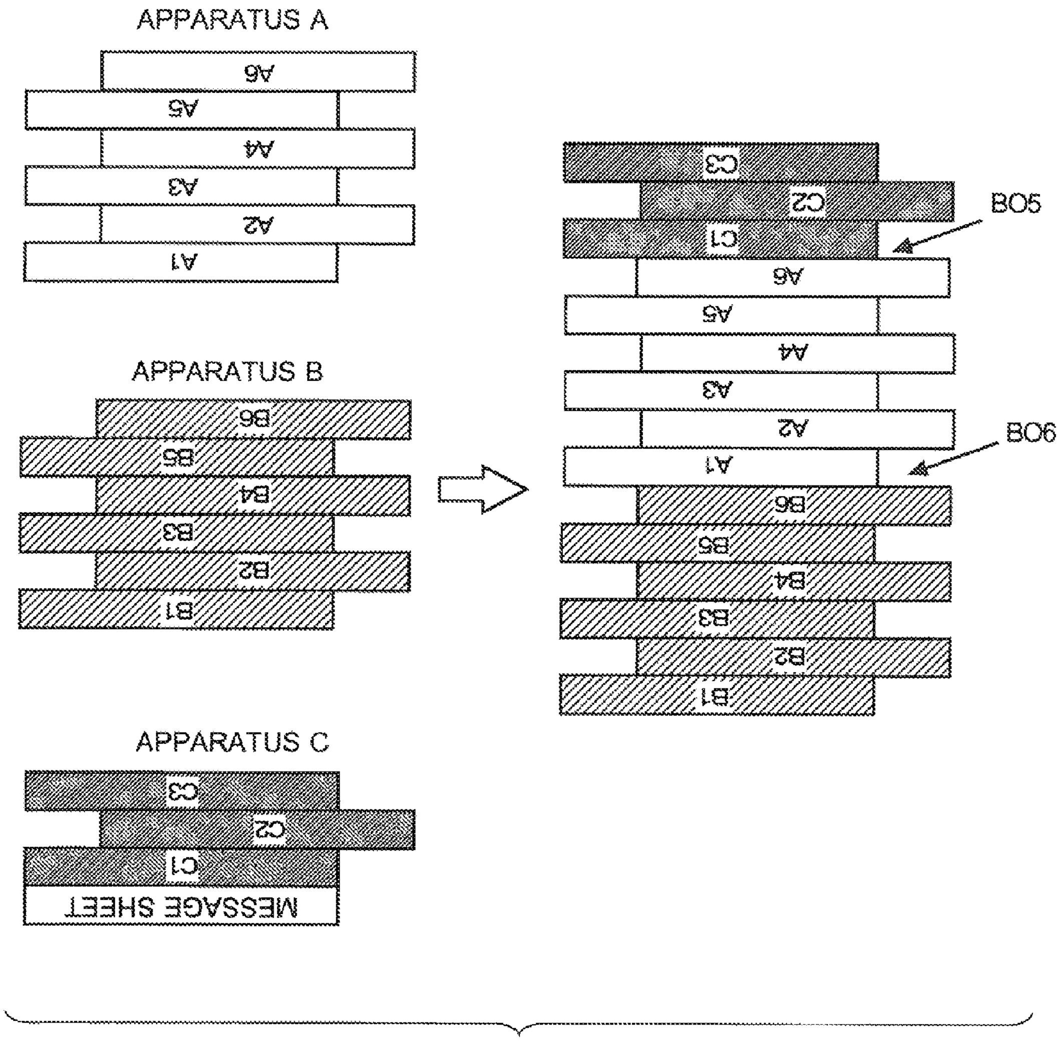
Figure 13:
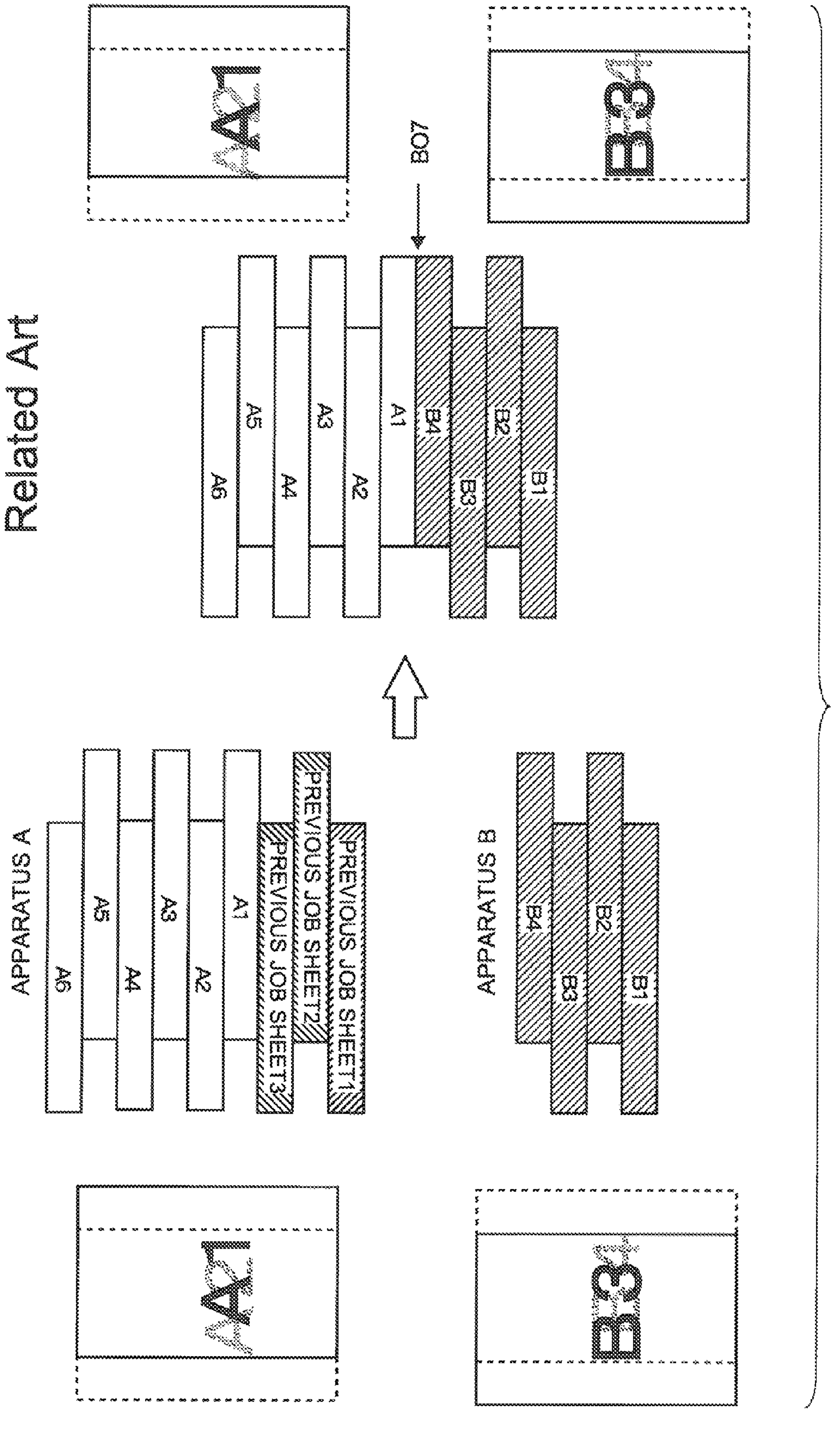
Figure 14:
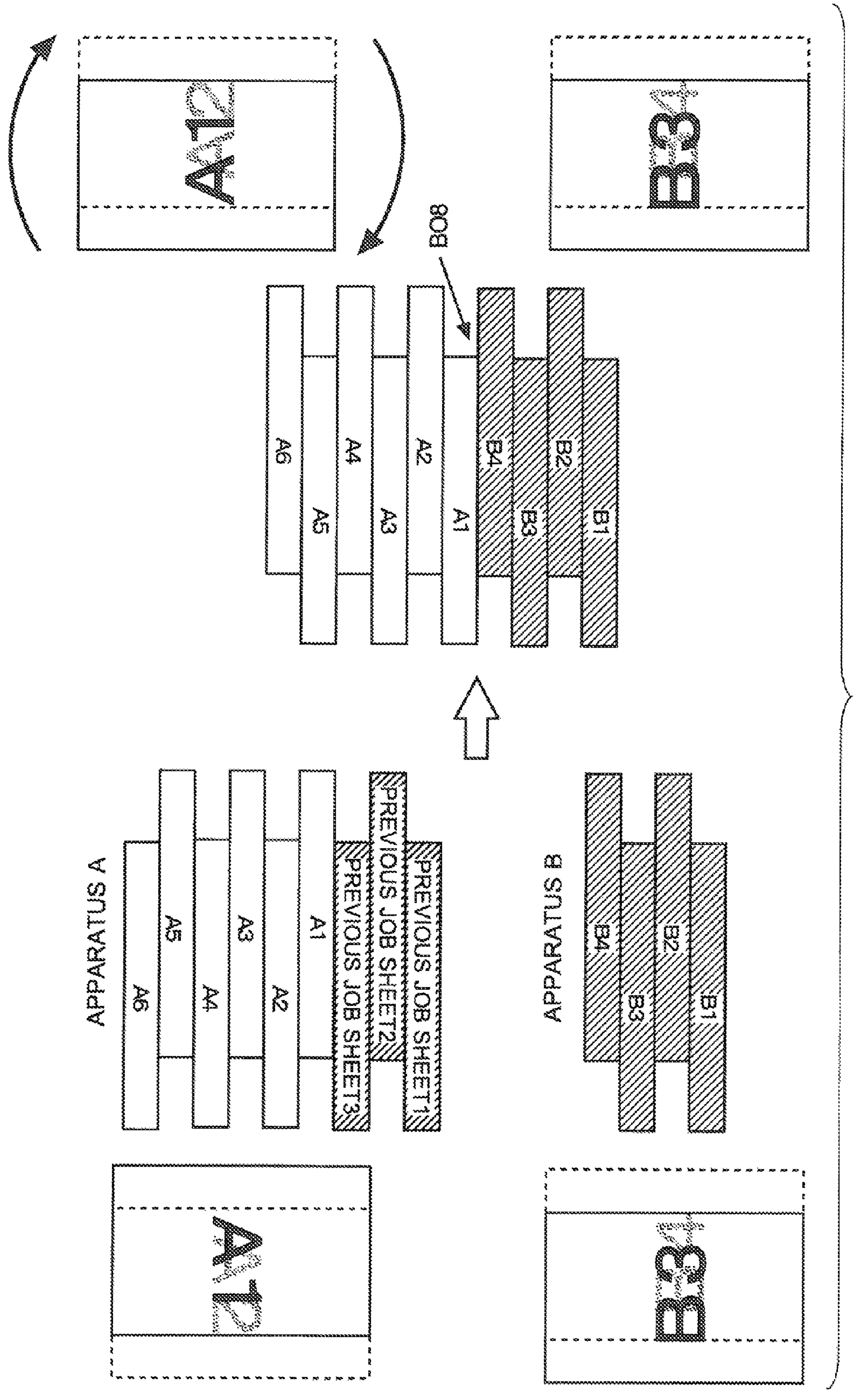
Figure 15:
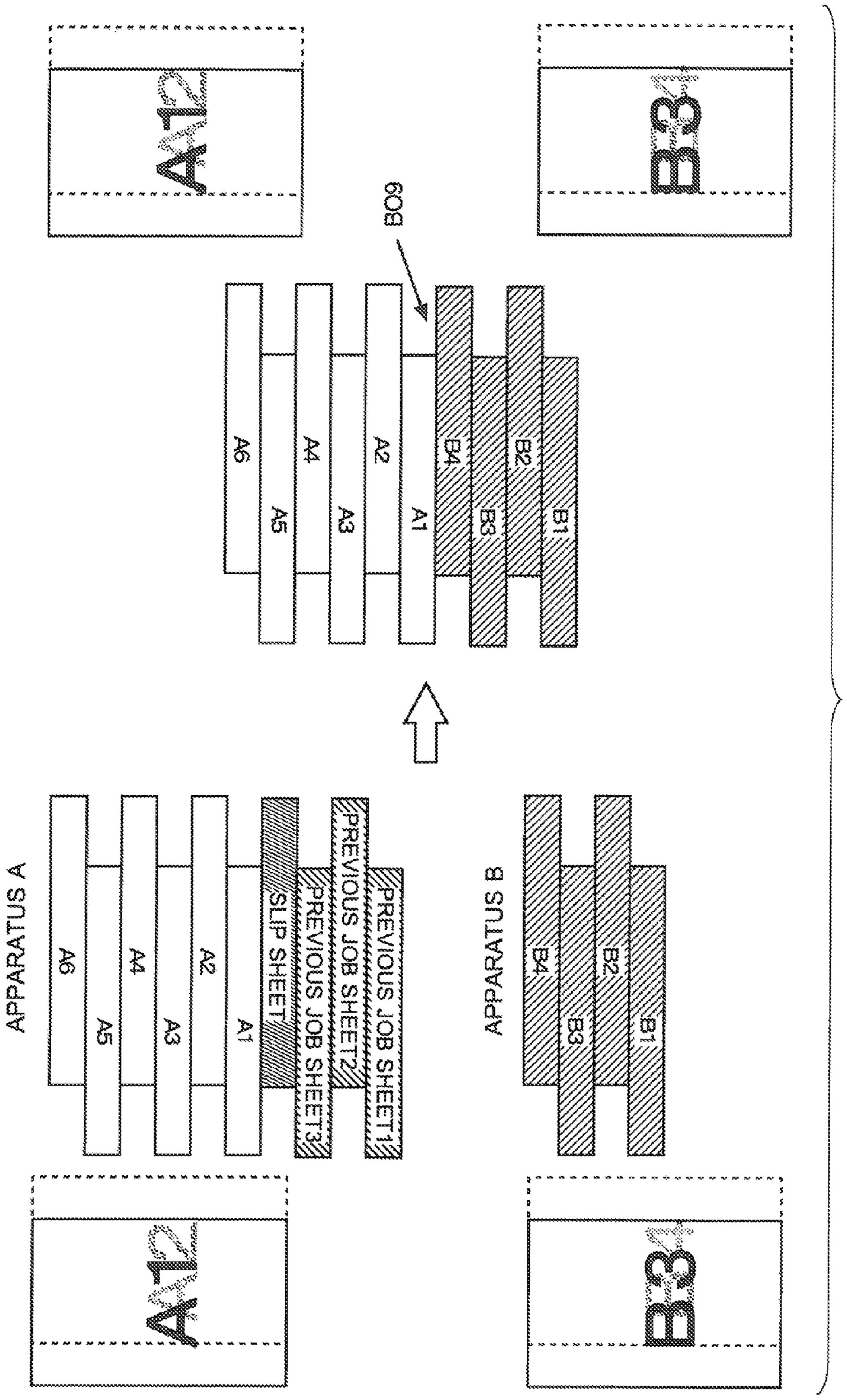
Figure 16:
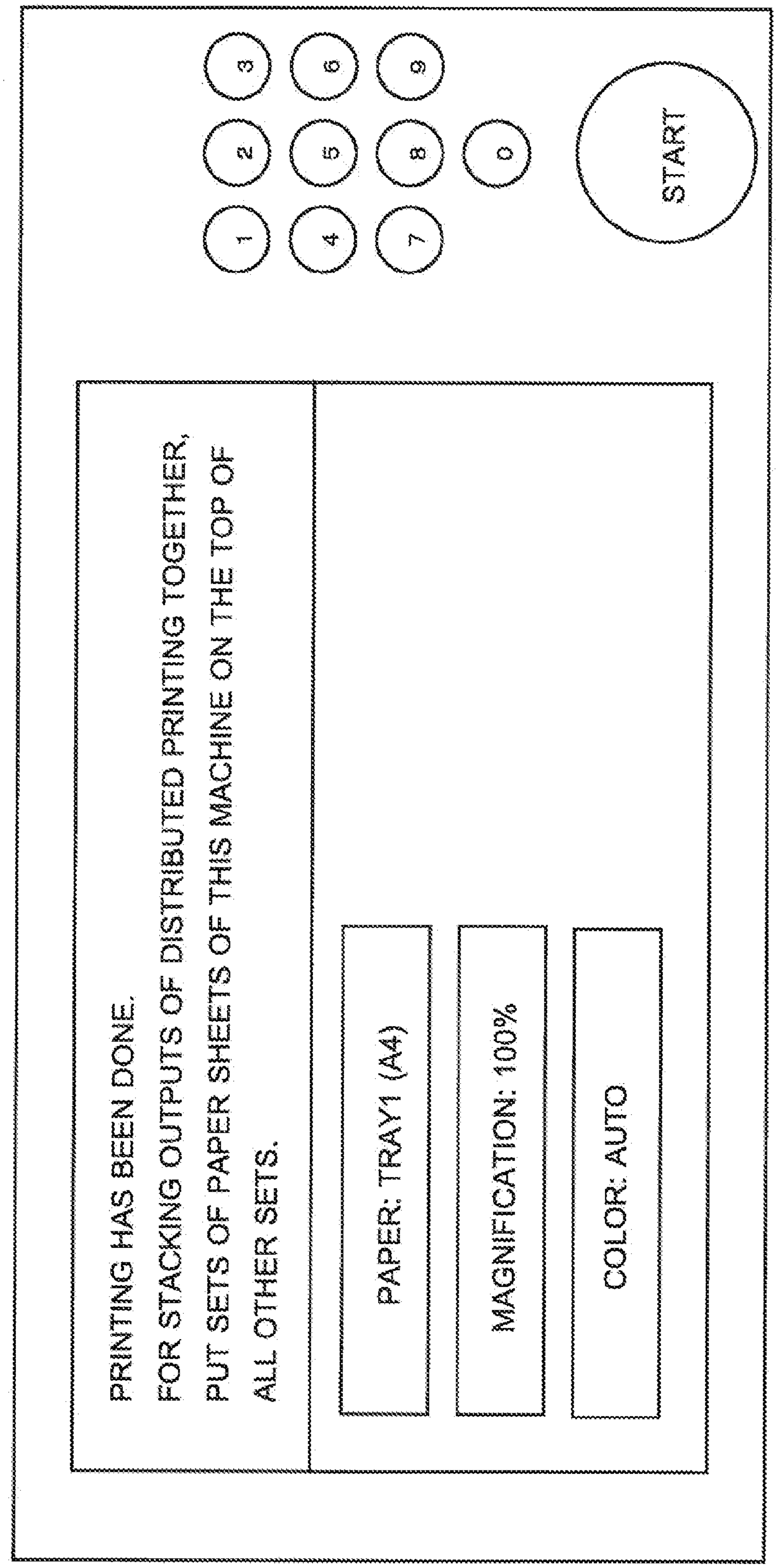
Figure 19:
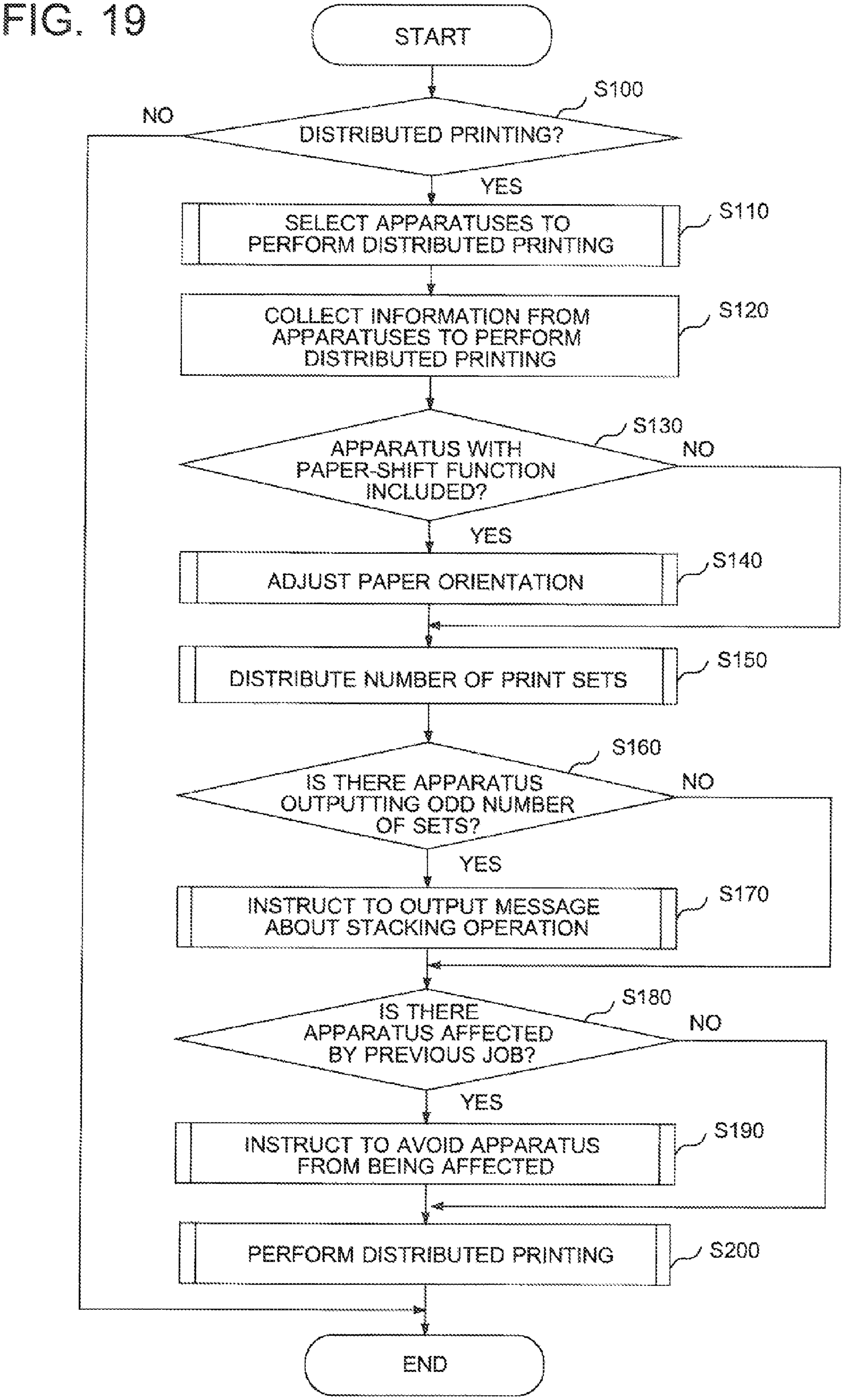
Figure 20:
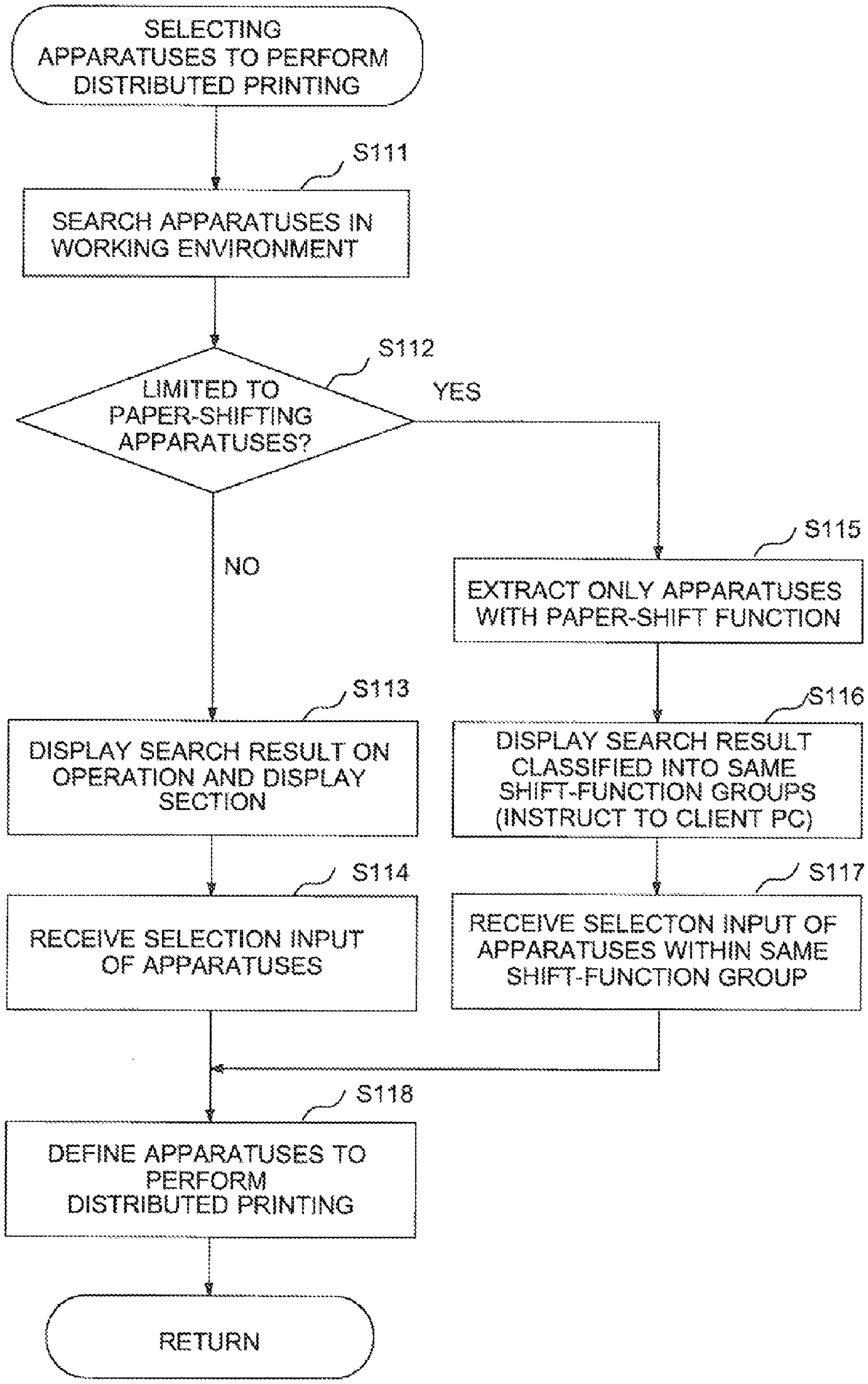
Figure 21:
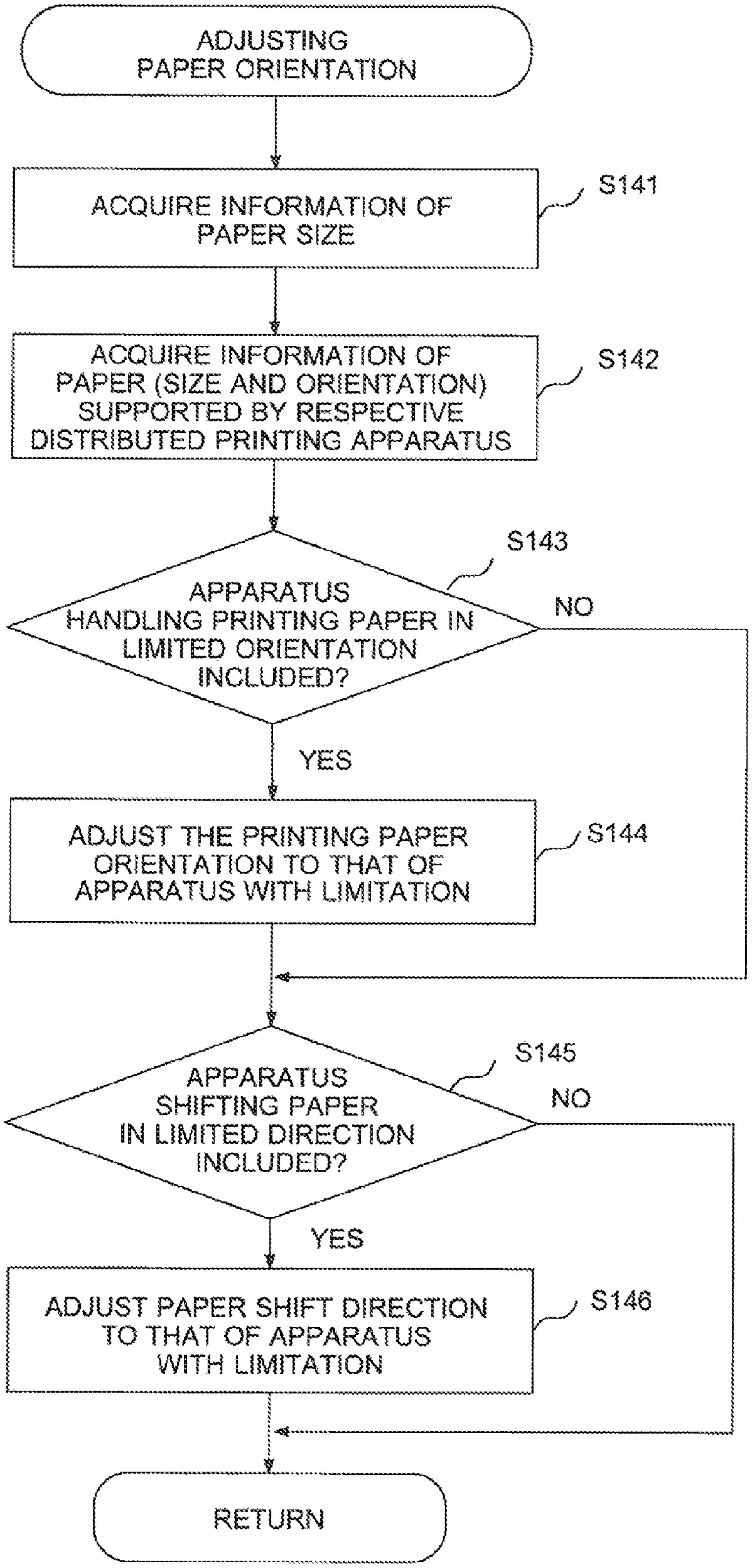
Figure 22:
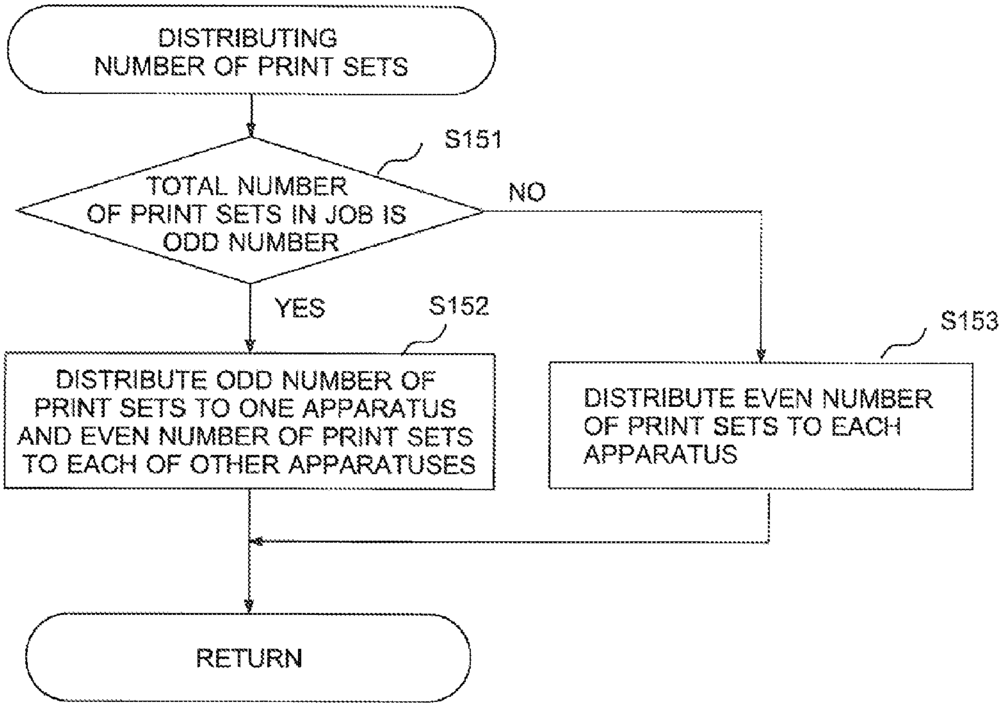
Figure 23:
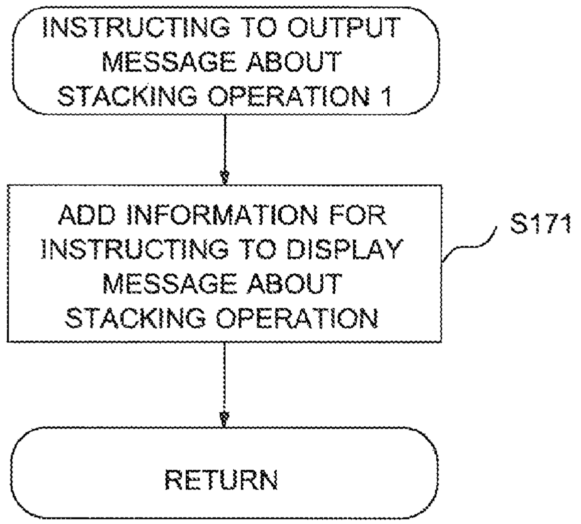
Figure 24:
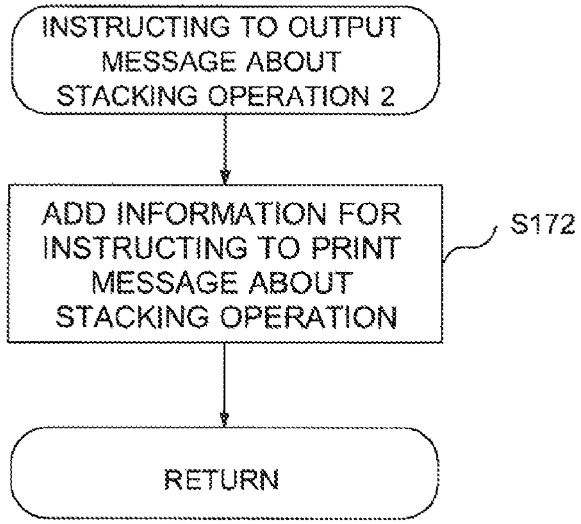
Figure 25:
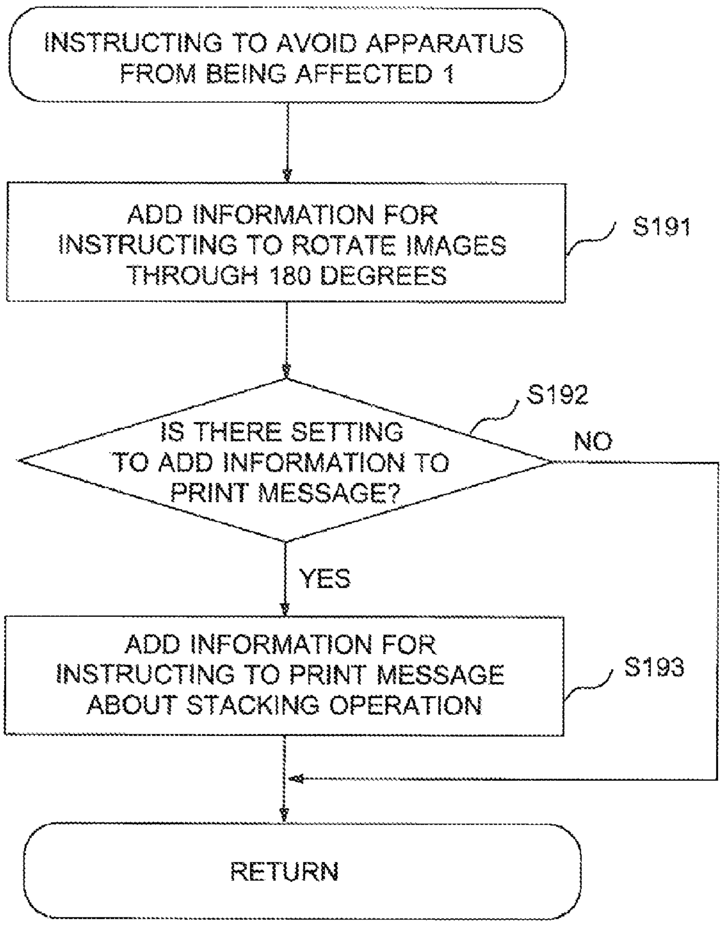
Figure 26:
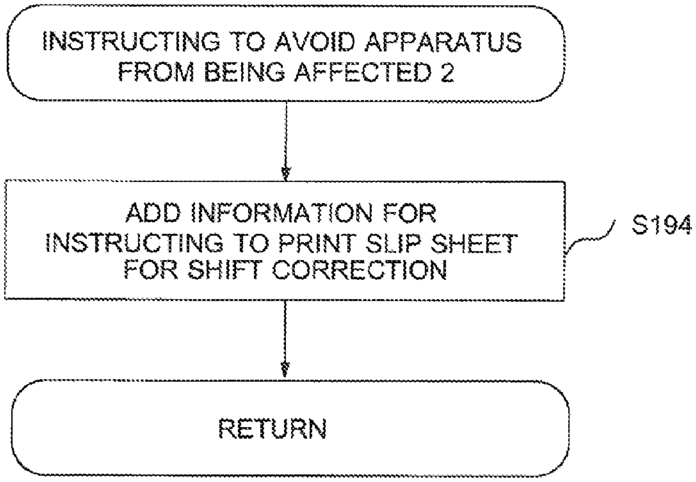
Figure 27:
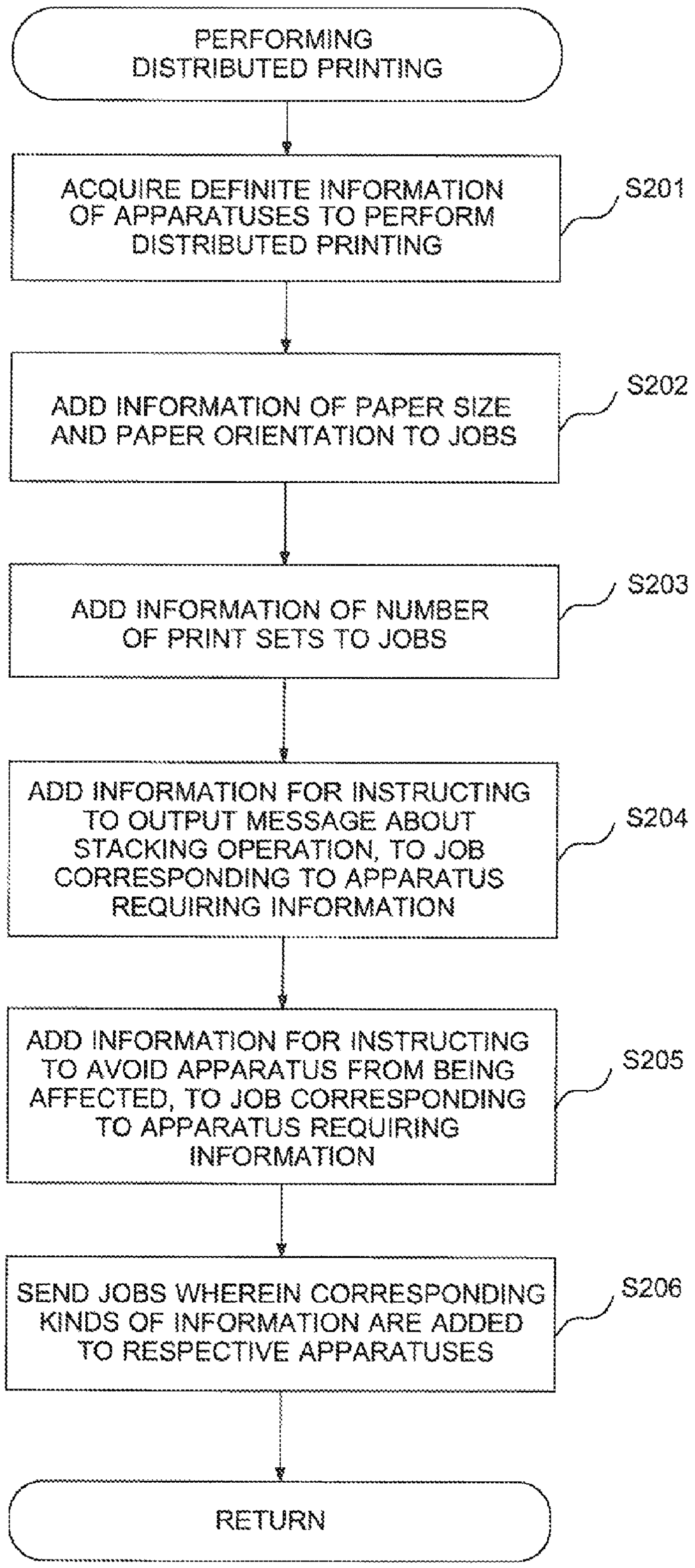
Figure 28:
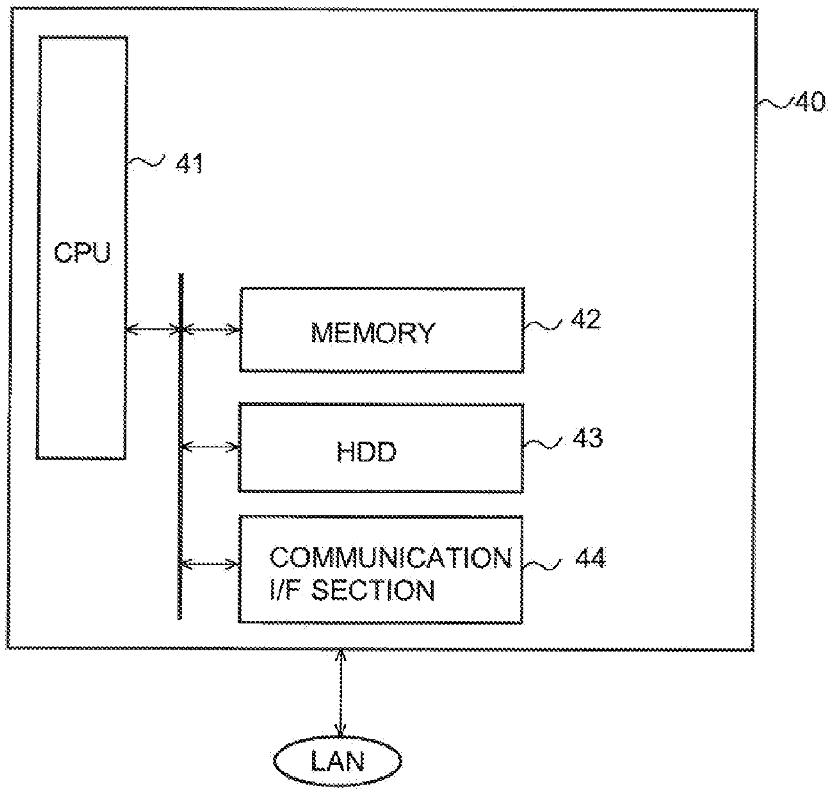
Figure 29:
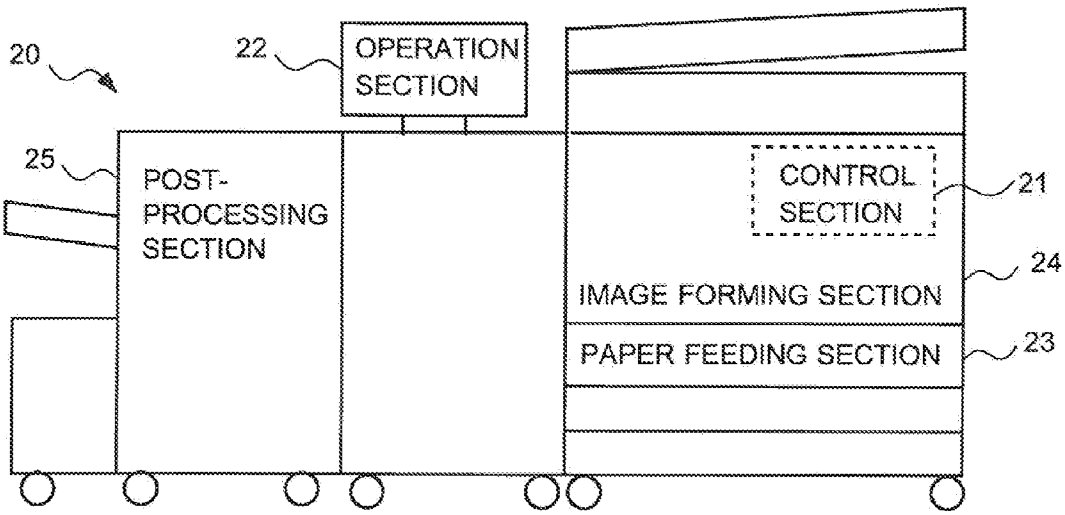
Figure 30:
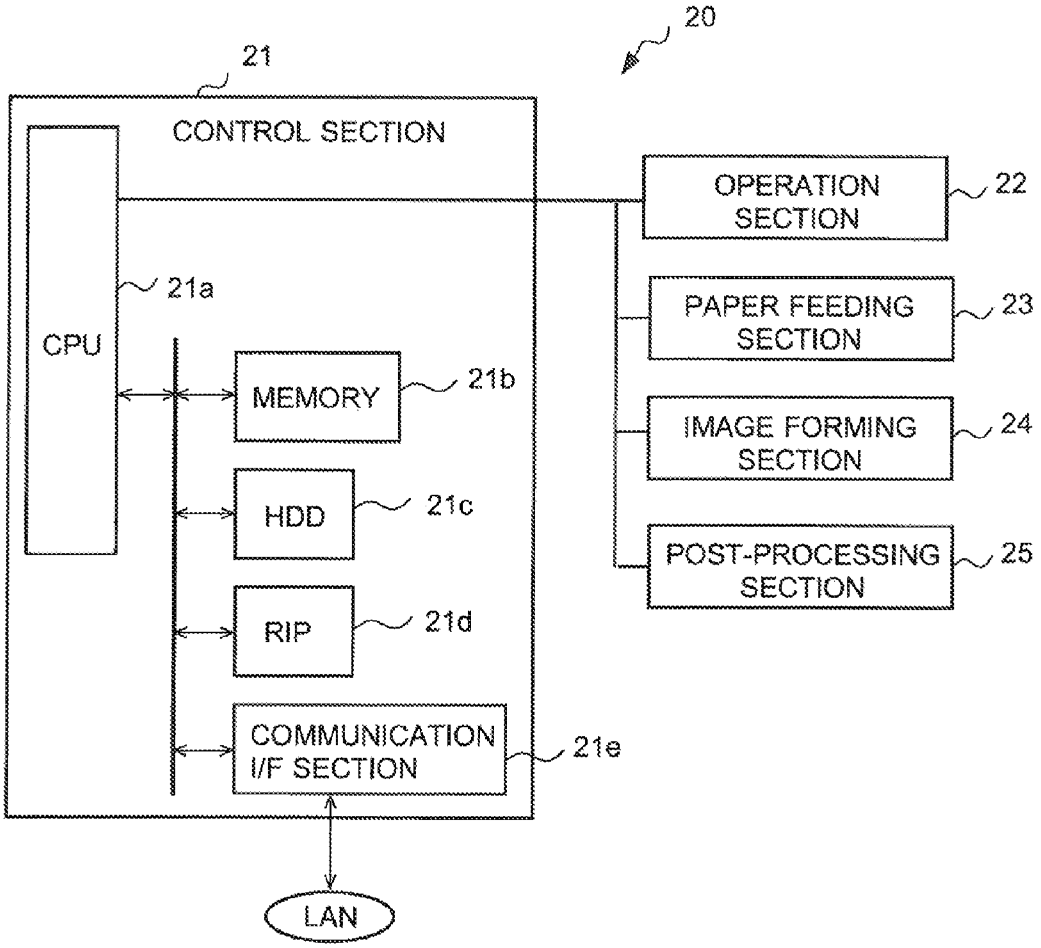

Each of FIGS. 5A and 5B is a diagram illustrating the situation that sets of paper sheets of SEF-shift ejection and sets of paper sheets of LEF-shift ejection are stacked together;

FIGS. 6A and 6B are diagrams illustrating SEF-shift ejection in apparatus A and LEF-shift ejection in apparatus B, respectively;

FIGS. 7A and 7B are diagrams illustrating the situations that all the paper orientation is adjusted to the direction of SEF in apparatus A and apparatus B, respectively;

FIGS. 8A and 8B are diagrams illustrating the situations that all the paper orientation is adjusted to the direction of LEF in apparatus A and apparatus B, respectively;

FIG. 9 is a diagram illustrating the condition of stacked sets of paper sheets when a job instructing 10 print sets is divided into jobs of 5 print sets and 5 print sets among two apparatuses;

FIG. 10 is a diagram illustrating the condition of stacked sets of paper sheets when a job instructing 10 print sets is divided into jobs of 6 print sets and 4 print sets among two apparatuses;

FIG. 11 is a diagram illustrating the condition of stacked sets of paper sheets when a job instructing 15 print sets is divided into jobs of 5 print sets, 5 print sets and 5 print sets among three apparatuses;

FIG. 12 is a diagram illustrating the condition of stacked sets of paper sheets when a job instructing 15 print sets is divided into jobs of 6 print sets, 6 print sets and 3 print sets among three apparatuses;

FIG. 13 is a diagram illustrating the condition of stacked sets of paper sheets when a job instructing 10 print sets is divided into jobs of 6 print sets and 4 print sets among two apparatuses, and apparatus A has a previous job;

FIG. 14 is a diagram illustrating the condition of stacked sets of paper sheets when a job instructing 10 copies is divided into jobs of 6 print sets and 4 print sets among two apparatuses;

FIG. 15 is a diagram illustrating the condition of stacked sets of paper sheets when a job instructing 10 print sets is divided into jobs of 6 print sets and 4 print sets among two apparatuses, apparatus A has a previous job, and a slip sheet is inserted into the outputs;

FIG. 16 is a diagram showing an illustrative screen (a screen for a warning message about stacking operations) displayed in an image forming apparatus, relating to an example of the present invention;

FIG. 17 is a diagram showing an example of printing a warning message about stacking operations under distributed printing, relating to an example of the present invention;

FIG. 18 is a diagram showing another example of printing a warning message about stacking operations under distributed printing, relating to an example of the present invention;

FIG. 19 is a flowchart illustrating operations of a distributed printing control apparatus, relating to an example of the present invention;

FIG. 20 is a flowchart illustrating operations of a distributed printing control apparatus (a process of selecting apparatuses to perform distributed printing), relating to an example of the present invention;

FIG. 21 is a flowchart illustrating operations of a distributed printing apparatus (a process of adjusting paper orientation) relating to an example of the present invention;

FIG. 22 is a flowchart illustrating operations of a distributed printing apparatus (a process of distributing the number of print sets) relating to an example of the present invention;

FIG. 23 is a flowchart illustrating operations of a distributed printing apparatus (a process of instructing to output a warning message about stacking operations) relating to an example of the present invention;

FIG. 24 is a flowchart illustrating operations of a distributed printing apparatus (a process of instructing to output a warning message about tacking operations, as another example) relating to an example of the present invention;

FIG. 25 is, a flowchart illustrating operations of a distributed printing apparatus (a process of instructing to avoid an apparatus from being affected) relating to an example of the present invention;

FIG. 26 is a flowchart illustrating operations of a distributed printing apparatus (a process of instructing to avoid an apparatus from being affected, as another example) relating to an example of the present invention;

FIG. 27 is a flowchart illustrating operations of a distributed printing apparatus (a process of performing distributed printing) relating to an example of the present invention;

FIG. 28 is a block diagram illustrating a stricture of a distributed printing control apparatus of the present example;

FIG. 29 is a diagram showing an outline structure of an image forming apparatus of the present example; and FIG. 30 is a block diagram illustrating a structure of an image forming apparatus of the present example.

DETAILED DESCRIPTION

Illustrative embodiments of non-transitory computer readable storage media storing a distributed printing control program will be described below with reference to the drawings. It will be appreciated by those of ordinary skill in the art that the description given herein with respect to those figures is for exemplary purposes only and is not intended in any way to limit the scope of potential embodiments may be resolved by referring to the appended claims.

Embodiments of the present invention have been provided in view of the abovementioned problems. One object of the embodiments is to provide a non-transitory computer readable storage media each storing therein a distributed printing control program, which allows, even when distributed printing is performed by plural image forming apparatuses with a paper-shift function, piling up plural sets of paper sheets without difficulty.

To achieve at least one of the abovementioned objects, there will be disclosed an illustrative non-transitory computer readable storage medium as an embodiment of the present invention. The non-transitory computer readable storage medium stores therein a distributed printing control program. The program is executed in a system to perform distributed printing by outputting a specified number of sets of paper sheets by using a plurality of image forming apparatuses, where the number of the sets is instructed by a job. The program causes a computable apparatus belonging to the system to function as a control section. The control section divides the job into a plurality of jobs. Each of the jobs causes one of the image forming apparatuses to eject a plurality of sets of paper sheets shifted in alternate directions such that when sets of paper sheets ejected by the plurality of image forming apparatuses are stacked up together, all the sets of paper sheets are shifted in alternate directions to enable each of the sets to be separated from others. The control section further subjects the divided jobs to the plurality of image forming apparatuses.

According to the illustrative non-transitory computer readable storage medium storing therein the distributed printing control program, plural sets of paper sheets can be stacked up without difficulty, even when the distributed printing is performed with plural image forming apparatuses with a paper-shift function, because of the following reason.

An apparatus belonging to a system performing distributed printing by using plural image forming apparatuses which are the same in paper orientation and paper-shift direction, or a distributed printing control program executed in the apparatus can control the print process, such that, when each of the plural image forming apparatuses outputs plural sets of paper sheets shifting in alternate directions and the sets of paper sheets of the plural image forming apparatuses are stacked up together, all the stacked sets of paper sheets are shifted alternately.

According to such the control, sets of paper sheets to which a shift-sort process has been applied in the distributed printing process have uniform paper orientation, which does not cause any difficulty even when the sets of paper sheets are stacked up. Further, in a part where sets of paper sheets is put on the other sets of paper sheets, the sets of paper sheets shift in different directions, which can solve the situation that the boundary of the sets become indefinite.

As described, in the above description about the background, distributed printing is utilized for processing a large amount of print jobs efficiently, and an image forming apparatus with a paper-shift function is utilized for reducing effort of sorting operations when a large amount of copies of the original are printed. However, the condition that distributed printing is performed by plural image forming apparatuses with a paper-shift function, can cause the situation that piling up the gathered plural sets of paper sheets is not easy because the sets of paper sheets are in various kinds of orientation and the situation that the boundary of the sets of paper sheets becomes indefinite because sets of paper to be stacked up together has been shifted in the same direction.

Therefore, one embodiment of the present invention provides a distributed printing system to perform distributed printing with plural image forming apparatuses with a paper-shift function according to a job instructing to make plural copies of outputs. In the system, paper orientation of each of the plural image forming apparatuses is made to be uniform and paper-shift direction is controlled with considering the number of sets of paper sheets to be distributed to each of the image forming apparatuses, in order to avoid troubles which appear when plural sets of paper sheets gathered from the image forming apparatuses are stacked up together.

EXAMPLES

Examples of a non-transitory computer readable storage medium storing a distributed printing control program will be described with reference to FIGS. 1 to 27, for illustrating the above described embodiment in detail.

Figure 1:
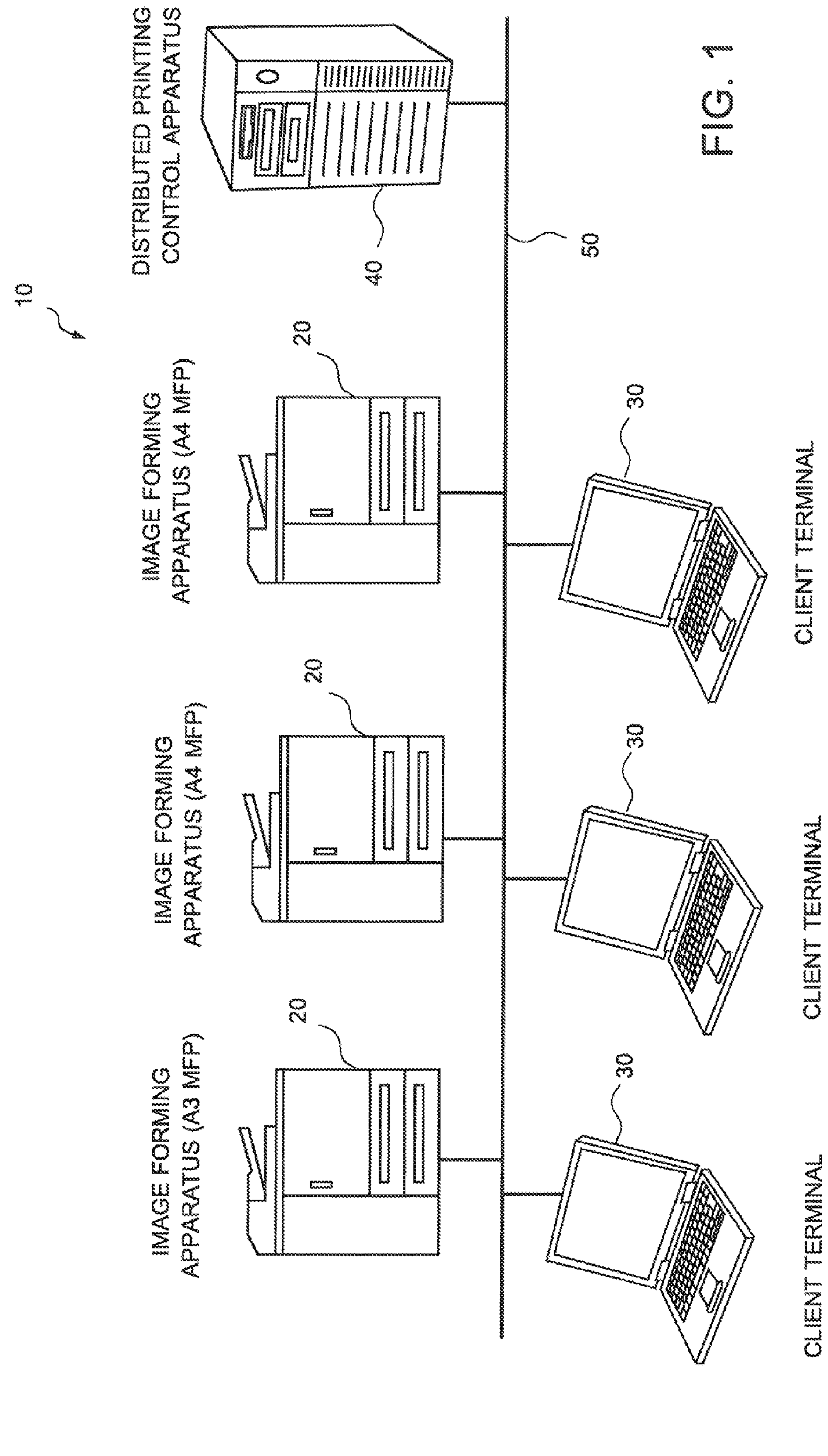
FIG. 1 is a schematic view illustrating a structure of a distributed printing system relating to an example of the present invention.

FIG. 1 is a schematic view illustrating a structure of a distributed printing system relating to an example of the present invention. Each of FIGS. 2A through 8B is a diagram for schematically illustrating a condition of paper ejection. Each of FIGS. 9 to 15 is a diagram for schematically illustrating the condition of stacked sets of paper sheets outputted under paper-shift ejection. FIG. 16 is a diagram showing an example screen of a warning message. Each of FIGS. 17 and 18 is a diagram showing an example of a printed warning message. Each of FIGS. 19 to 27 is a flowchart illustrating operations of a distributed printing control apparatus of the present example. FIG. 28 is a block diagram illustrating a structure of a distributed printing control apparatus of the present example. FIG. 29 is a diagram showing an outline structure of an image forming apparatus of the present example. FIG. 30 is a block diagram illustrating a structure of an image forming apparatus of the present example.

As shown in FIG. 1, distributed printing system 10 of the present example has a structure wherein plural image forming apparatuses 20 (three image forming apparatuses in FIG. 1) such as MFPs (multi function peripherals) are connected to network 50 such as LAN (Local Area Network). In the system, client terminals 30, such as personal computers, for instructing a print process to image forming apparatuses 20, are also connected to network 50. Further, distributed printing control apparatus 40 for performing distributed printing is connected to network 50.

Each of image forming apparatuses 20 includes a copy function of reading an image of an original optically and printing a reproduction or the image on recording paper; and a printer function of rasterizing print data received from client terminals 30 to expand the data into image data and of outputting and printing images corresponding to the image data onto recording paper. Each of image forming apparatuses 20 individually has a predetermined maximum paper size that each image forming apparatus can print out Each of image forming apparatuses 20 further has a paper-shift function of shifting plural printed matters printed by itself by one print set at a time, in directions perpendicular to the direction of paper conveyance and of outputting them into a paper ejection tray.

Each of FIGS. 29 and 30 shows an example of image forming apparatus 20. Image forming apparatus 20 is composed of components including control section 21, operation section 22, paper feeding section 23, image forming section 24, and post-processing section 25.

Control section 21 is a component to control the other components and is communicatively connected with CPU (Central Processing Unit) 21*a*, memory 21*b*, HDD (Hard Disk Drive) 21*c*, RIP (Raster Image Processing) 21*d*, and communication interface section 21*e* through a bus.

CPU 21*a* controls the other components and performs image processing including a RIP process (as software). Memory 21*b* is a component to temporarily store various data read from a component such as RIP 21*d*, communication interface section 21*e*, and HDD 21*c*. The stored image data is processed by CPU 21*a*, and is transferred to a component such as HDD 21*c* and image forming section 24 as the need arises. HDD 21*c* stores programs which are used by CPU 21*a* to control the other components, and information relating to processing functions of the device itself CPU 21*a* reads the stored programs and further processes and executes the stored programs on memory 21*b* as the need arises. RIP 21*d* is composed of a software program processed by ASIC (Application Specific Integrated Circuit) and CPU 21*a*, and forms bitmap images for use in variable printing. Communication interface section 21*e* establishes a connection to client terminals 30, distributed printing control apparatus 40, and other devices and performs transmission and reception of data.

Operation section 22 is composed of a touch panel, which allows various operations thereon. The operation function may be realized on an alternative such as the WEB and an application as far as it can provide an operation function, which is not limited to a touch panel.

Paper feeding section 23 is provided as a component to house printing paper therein, and also includes a part to feed printing paper to image forming section 24.

Image forming section 24 is a general name of structural elements required for forming images in an image forming apparatus by utilizing image processing such as an electrophotographic recording and electrostatic recording. Image forming section 24 includes photoreceptors, a transfer belt, a fixing unit, and various types of conveyer belt Image forming section 24 forms image data read from memory 21*b* into images on printing paper and transfers the printing paper to post-processing section 25.

Post-processing section 25 outputs printing paper transferred from image forming section 24 with performing a finishing process to the paper desired by a user, such as punching, stapling and binding, according to instructions from control section 21.

Each of client terminals 30 has a function of generating print data to instruct a printing process and of transmitting the data to distributed printing control apparatus 40, FIG. 28 shows an example of distributed printing control apparatus 40 of the present example. Distributed printing control apparatus 40 is composed of components including CPU 41, Memory 42, HDD 43, and communication interface section 44.

CPU 41 controls the other components. Memory 42 can be ROM (Read Only Memory) or RAM (Random Access Memory), and is a component to temporarily store various data read from a component such as HDD 43 and communication interface section 44. The stored data is processed by CPU 41, and is transferred to a component such as HDD 43 and communication interface section 44 as the need arises. HDD 43 stores programs which are used by CPU 41 to control the other components, information relating to processing functions of the device itself, and image data CPU 41 reads the stored programs as the need arises, and further processes and executes them on memory 42. Communication interface section 44 establishes a connection to image forming apparatuses 20, client terminals 30, and other devices and performs transmission and reception of data.

Distributed printing control apparatus 40 may further include a control and display section for providing a display and control function, such as a touch panel. The display and control function may be realized on an alternative such as the WEB and an application as far as it can provide an operation function and a display function, which is not limited to a touch panel.

Distributed printing control apparatus 40 is a control apparatus for performing distributed printing and has a function of dividing print data received from client terminals 30 into pieces of print instructions and of sending the print instructions to individual image forming apparatuses, to realizing a distributed printing process.

Herein, FIG. 1 shows a structure that distributed printing control apparatus 40 instructs distributed printing to plural image forming apparatuses 20. However, there can be provided a structure that any one of image forming apparatuses 20 receives print data from client terminals 30 and instructs distributed printing to plural image forming apparatuses 20 (which may include the instructing image forming apparatus itself or not). In this case, distributed printing control apparatus 40 may be omitted. Alternatively, there can be provided a structure that any one of client terminals 30 instructs distributed printing directly to image forming apparatuses 20. In this case, distributed printing control apparatus 40 may also be omitted. Further, there can be provided a structure that any one of image forming apparatuses 20 reads the original and instructs distributed printing to make copies of the original to plural image forming apparatuses 20 (which may include the instructing image forming apparatus itself or not). In that case, client terminals 30 and distributed printing control apparatus 40 may be omitted.

As described above, distributed printing can be controlled by any one of image forming apparatuses 20, client terminals 30 and distributed printing control apparatus 40. A control of distributed printing of the present example can be realized by executing a program installed in any one of those apparatuses by using a control section including a CPU (Central Processing Unit) and memories such as ROM (Read Only Memory) and RAM (Random Access Memory).

Hereinafter, a control of distributed printing of the present example will be described in detail. First, for easy understanding the present invention, problems which can be caused in a conventional distributed printing process and their solution will be described with reference to FIGS. 2A to 8B.

Figure 2A:
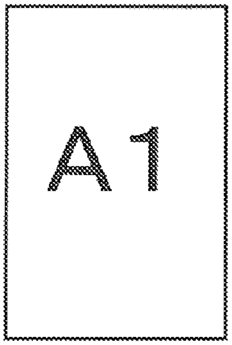
FIGS. 2A and 2B are diagrams illustrating SEF-normal ejection and LEF-normal ejection, respectively.
Figure 2B:
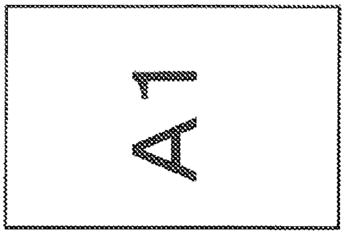

FIG. 2A shows the situation after images haves been printed on sheets of paper in the SEF (Short Edge Feed) orientation and the sheets have been outputted under normal ejection (without shifting), and FIG. 2B shows the situation after images have been printed on sheets of paper in the LEF (Long Edge Feed) orientation and the sheets have been outputted under normal ejection (without shifting).

Figure 3A:
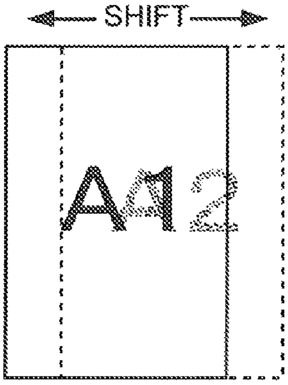
FIGS. 3A and 3B are diagrams illustrating SEF-shift ejection and LEF-shift ejection, respectively.
Figure 3B:
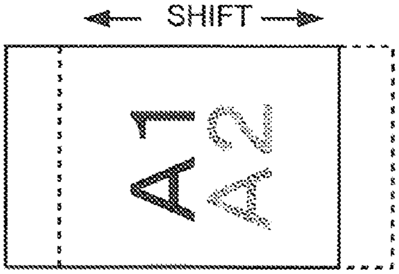

FIGS. 3A and 3B show the situation after images have been printed on sheets of paper in the SEF orientation and the sheets have been outputted under paper-shift ejection, and the situation after images have been printed on sheets of paper in the LEF orientation and the sheets have been outputted under paper-shift ejection, respectively. In the situation that sheets in the SEP orientation have been shifted, the sheets are stacked up such that the short edges of the sheets are lined up and the long edges of the sheets are shifted in alternate directions. In the situation that sheets in the LEF orientation of have been shifted, the sheets of paper are stacked up such that the long edges of the sheets are lined up and the short edges of the sheets are shifted in alternate directions.

Figure 4A:
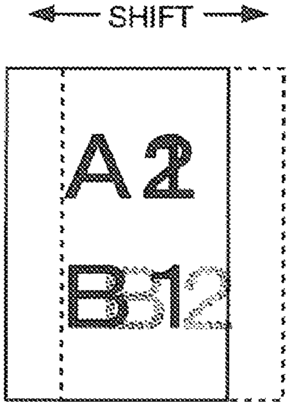
FIGS. 4A and 4B are diagrams illustrating the situations that a set of paper sheets of normal ejection is stacked on sets of paper sheets of SEF-shift ejection and on sets of paper sheets of LEF-shift ejection, respectively.
Figure 4B:
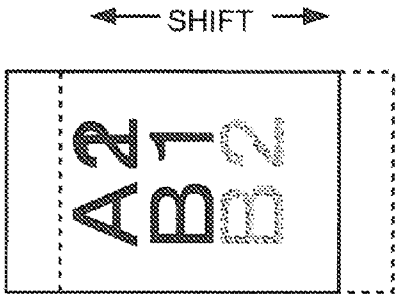

FIG. 4A shows the situation after a set of paper sheets (A) outputted under normal ejection (in the SEF or LEF orientation) has been stacked on sets of paper sheets (B) wherein images were printed on paper sheets in the SEF orientation and the sheets were outputted under paper-shift ejection. FIG. 4B shows the situation after a set of paper sheets (A) outputted under normal ejection (in the SEF or LES orientation) has been stacked on sets of paper sheets (B) wherein images were printed on paper sheets in the LEF orientation and the sheets were outputted under paper-shift ejection. In both of the situations, the first-printed set of the sets of paper sheets (B) and the set of paper sheets (A) are stacked together to be in a good condition, and paper sheets do not project irregularly from all the stacked sets of paper sheets.

FIG. 5A shows the situation after sets of paper sheets (A) wherein images were printed on paper sheets in the SEF orientation and the sheets were outputted under paper-shift ejection and sets of paper sheets (B) wherein images were printed on paper sheets in the LEF orientation and the sheets were outputted under paper-shift ejection have been stacked together as they were after being ejected. FIG. 5B shows the situation after the sets of paper sheets (A) and the sets of paper sheets (B) have been stacked together with one of them rotated through 90 degrees in order to make the orientation of the images in the sets of paper sheets uniform. In both situations, paper projections (P) appear in the stack of the sets of paper sheets (A) and the sets of paper sheets (B).

FIGS. 6A and 6B show examples under the condition that images have been printed by two image forming apparatuses 20 of apparatus A and apparatus B in distributed printing without making the orientation of paper sheets uniform among the apparatuses. FIG. 6A shows an example that apparatus A has outputted paper sheets in the SEF orientation under paper-shift ejection, and FIG. 6B shows the example that apparatus B has outputted paper sheets in the LEF orientation under paper-shift ejection. When those sets of paper sheets are stacked together, irregular projections which are similar to FIGS. 5A and 5B will appear in the stack.

FIGS. 7A and 7B show examples under the condition that images have been printed by two image forming apparatuses 20 of apparatus A and apparatus B distributed printing with paper sheets made in the SEF orientation uniformly. in the examples, each of apparatus A and apparatus B has outputted paper sheets in the SEF orientation under paper-shift ejection. Because apparatus A and apparatus B shift paper sheets in the same direction, stacking up the sets of paper sheets outputted from the apparatus A and the apparatus B does not cause irregular projections as shown in FIGS. 5A and 5B in the stack.

FIGS. 8A and 8B show examples under the condition that images have been printed by two image forming apparatuses 20 of apparatus A and apparatus B in distributed printing with paper sheets made in the LEF orientation uniformly. In the examples, each of apparatus A and apparatus B have outputted paper sheets in the LEF orientation under paper-shift ejection. Because apparatus A and apparatus B shift paper sheets also in the same direction, stacking up the sets of paper sheets outputted from the apparatus A. and the apparatus B does not cause irregular projections as shown in FIGS. 5A and 5B in the stack.

As described above, when distributed printing is performed with plural image forming apparatuses 20, paper-shift ejection is performed with the orientation of paper sheets made in the SEF or LEF orientation uniformly, as shown in FIGS. 7A, 7B, 8A and 8B, which avoids an irregular projection from appearing in the stack prepared by stacking up sets of paper sheets of the plural image forming apparatuses together.

Next, there will be described a problem which can be caused when plural sets of paper sheets outputted by distributed printing by using plural image forming apparatuses 20 are stacked up together, and a solution of the problem, with reference to FIGS. 9 to 15.

FIG. 9 shows an example that a job to output an even number of print sets in total, is divided into pieces equally to be distributed to plural image forming apparatuses 20. In this example, a job instructing 10 print sets in total is divided into jobs of 5 print sets to each of two apparatuses of apparatus A and apparatus B. Each of the apparatuses performs face-down ejection (the way to eject paper sheets with the printed side facing down), and starts shifting paper sheets at the left-hand side of the sheet of FIG. 9. Each of apparatuses A and B performs paper-shift ejection in the order of left, right, left, right and left directions, to print out an odd number of print sets. In this case, the first-printed set and the last-printed set are always shifted to the same position. Herein, there will be considered the condition that an operator stacks sets of paper sheets outputted by the two apparatuses together without changing the orientation of all the paper sheets and the condition that an operator stacks sets of paper sheets outputted by the two apparatuses together, viewing images of the top sheets of the two groups of sets of paper sheets, with adjusting the orientation of images of the top sheets to be uniform. Under any of the conditions, the last-printed set of apparatus B and the first-printed set of apparatus A are shifted in the same direction, which makes a problem that the boundary of the sets (BO1) becomes indefinite. From the viewpoint that a paper-shift function is a function for separating plural printed matters into individual print sets, it is hardly considered that the situation causing such the problem achieves the object of the paper-shift function.

FIG. 10 shows an illustrative condition that a job to output an even number of print sets in total, is divided into pieces to be distributed to plural image forming apparatuses 20 such that each apparatus outputs an even number of print sets. In this example, a job instructing 10 print sets in total is divided into jobs of 6 print sets and 4 print sets between two apparatuses of apparatus A and apparatus B. Similarly to the above example, each of the apparatuses performs face-down ejection, and starts shifting paper sheets at the left-hand side. Each of apparatuses A and B performs paper-shift ejection in the order of directions of left, right, left, right, left . . . , to print out an even number of print sets. In this case, the first-printed set and the last-printed set of each apparatus are always shifted to the different positions. Herein, there will be considered the condition that an operator stacks sets of paper sheets outputted by the two apparatuses together without changing the orientation of all the paper sheets, and the condition that an operator stacks sets of paper sheets outputted by the two apparatuses together, viewing images of the top sheets of the two groups of sets of paper sheets, with adjusting the orientation of images of the top sheets to be uniform. Under any of the conditions, the last-printed set of apparatus B and the first-printed set of apparatus A are shifted in the different directions and the boundary (BO2) of the sets becomes indefinite when all the set of paper sheets axe stacked together, which is considered as the object of the paper-shift function has been achieved. Alternatively, the situation that each of the apparatuses performs face-up ejection (the way to eject paper sheets with the printed side facing upward) and the situation that each of the apparatuses starts shifting paper sheets at the right-hand side of the sheet of the figure will result in the same effect.

FIG. 11 shows an example that a job to output an odd number of print sets in total, is divided into pieces equally to be distributed to plural image forming apparatuses 20. In this example a job instructing 15 print sets in total is divided between three apparatuses of apparatus A, apparatus B and apparatus C, into jobs of 5 print set each. Similarly to the above-described examples, each of the apparatuses performs face-down ejection, and starts shifting the sheets at the left-hand side of the sheet of FIG. 11. Each of apparatuses A, B and C performs paper-shift ejection in the order of left, right, left, right and left directions, to print out an odd number of print sets. In this case, the first-printed set and the last-printed set are always shifted to the same position. Herein, there will be considered the condition that an operator stacks sets of paper sheets outputted by the three apparatuses together without changing the orientation of all the paper sheets, and the condition that an operator stacks sets of paper sheets outputted by the three apparatuses together, viewing images of the top sheets of the three groups of sets of paper sheets, with adjusting the orientation of images of the top sheets to be uniform. Under these conditions, the last-printed set of apparatus C and the first-printed set of apparatus B are shifted in the same direction, and the last-printed set of apparatus B and the first-printed set of apparatus A are shifted in the same direction, which makes a problem that the boundaries (BO3, BO4) of the sets becomes indefinite.

FIG. 12 shows an example that a job to output an odd number of print sets in total, is divided into pieces to be distributed to plural image forming apparatuses 20, so as to distribute an odd number of print sets to only one apparatus and an even number of print sets to each of the other apparatuses. In this example, a job instructing 15 print sets in total is divided into jobs of 6 print sets, 6 print sets and 3 print sets between three apparatuses of apparatus A, apparatus B and apparatus C. Similarly to the above-described examples, each of the apparatuses performs face-down ejection, and starts shifting paper sheets at the left-hand side of the sheet of FIG. 12. Each of apparatuses A and B performs paper-shift ejection in the order of directions of left, right, left, right . . . , to print out an even number of print set. In this case, the first-printed set and the last-printed set are always shifted to different positions. Apparatus C performs paper-shift ejection in the order of directions of left, right and left to print out an odd number of print sets. In this case, the first-printed set and the last-printed set are always shifted to the same position.

In this situation, the order of stacking sets of paper sheets outputted from the three apparatuses can causes a problem. Herein, there will be considered the condition that an operator stacks sets of paper sheets outputted by the three apparatuses together without changing the orientation of all the paper sheets, and the condition that an operator stacks sets of paper sheets outputted by the three apparatuses together, viewing images of the top sheets of the three groups of sets of paper sheets, With adjusting the orientation of images of the top sheets to be uniform. Under these conditions, stacking up the sets of paper sheets of apparatuses each outputting an even number of sets, as shown in FIG. 10, causes no troubles regardless of the way of stacking the sets together. However, when sets of paper sheets of an apparatus outputting an odd number of sets are to be stacked, the print process is required to be controlled not to cause the troubles shown in FIGS. 9 and 11.

In FIG. 12, as a solution of the situation that sets of paper sheets outputted from the three apparatuses are stacked together, an odd number of sets of paper sheets is put on a stack (on a set of paper sheets A6 in FIG. 12) wherein plural groups of an even number of sets of paper sheets are stacked together. Thereby, the last-printed set of apparatus A and the first-printed set of apparatus C are shifted in different directions, additionally to the fact that the last-printed set of apparatus B and the first-printed set of apparatus A are shifted in different directions, which makes the boundaries (BO5, BO6) of the sets definite. While this stacking order can be decided by a user, instructing the order by apparatuses allows a user realizing such the stacking operations more reliably. For example, prior to outputting an odd number of print sets in apparatus C in FIG. 12, apparatus C prints out a message sheet as shown in FIG. 17 and outputs the message sheet with being shifted to the same position of the first-printed set of paper sheets (C1), which realizes the above-described stacking operations easily. Alternatively, as shown in FIG. 16, apparatus C which outputs an odd number of sets may display, on its panel, a notice about stacking sets of paper sheets together, which also provides the similar effects as the message sheet. This example can be applied also to the situation that each apparatus performs face-up ejection and the situation that each apparatus starts shifting paper sheets at the right-hand side of the sheet of FIG. 12. Under the condition of face-up ejection, the message sheet may be outputted on the third-printed set of paper sheets (C3) to be shifted to an arbitrary position.

When an apparatus to print an odd number of print sets outputs paper sheets with the printed side facing down, there can be provided a request to stack sets of paper sheets of apparatuses together, with putting sets of paper sheets outputted by the apparatus of an odd number of sets at the bottom of sets of paper sheets of all the other apparatuses, in place the message shown in FIG. 17. In other words, there can be provided a request to a user to place an odd number of sets of paper sheets on top of the other sets of paper sheets under the situation that the apparatus to print an odd number of sets outputs paper sheets with the printed side facing up, and a request to a user to place an odd number of sets of paper sheets at the bottom of the other sets of paper sheets under the situation that the apparatus to print an odd number of print sets outputs paper sheets with the printed side facing down.

FIG. 13 shows an example that an apparatus to perform distributed printing has a previously submitted job and a target job of distributed printing is hardly estimated to start at an expected shift position (the left-hand side in this case). In this example, it is assumed that there is generated a previously submitted job to make an odd number of print sets in apparatus A. Herein, there will be considered the condition that an operator stacks sets of paper sheets outputted by the two apparatuses together without changing the orientation of all the paper sheets, and the condition that an operator stacks sets of paper sheets outputted by the two apparatuses together, viewing images of the top sheets of the two groups of sets of paper sheets, with adjusting the orientation of images of the top sheets to be uniform. Because the target job in apparatus A starts paper-shift ejection at the right-hand side, the last-printed set of apparatus B and the first-printed set of apparatus A are shifted to the same position under these conditions, which causes a problem that the boundary (BO7) of the print sets are indefinite.

FIG. 14 shows a solution of the problem of FIG. 13. Apparatus A prints images of the target job on paper sheets with rotating the images through 180 degrees and outputs the paper sheets. Thereby, when an operator stacks sets of paper sheets outputted by two apparatuses together, viewing images on the top sheets of the print sets of two apparatuses, with rotating a group of sets of paper sheets through 180 degrees so as to make the orientation of the images uniform, the last-printed set of the apparatus B and the first-printed set of apparatus A are shifted in the different directions, which makes the boundary (BO8) of the sets definite. FIG. 15 shows another solution of the problem of FIG. 13. Apparatus A inserts a slip sheet for a paper-shift correction on the top of the target job in apparatus A. This type of control also can correct the paper-shift position, of the first-print set of the target job in an expected direction. In other words, the last-printed set of the apparatus B and the first-printed set of the target job of apparatus A are shifted in the different directions, which makes the boundary (BO9) of the sets definite. This example can be applied to the situations that each apparatus performs face-up ejection and that each apparatus start shifting paper sheets at the right-hand side of the sheet of FIG. 14. In this example, the above control is performed under the condition that the existence of a previously submitted job changes the shift position as shown in FIG. 13. However, also under the condition that there is no previously submitted job as shown in FIGS. 9 and 11, rotating the sets of paper sheets through 180 degrees or inserting a slip sheet in place of controlling the number of print sets for distribution can avoids the problem that the boundary of print sets becomes indefinite.

Accordingly, when plural sets of paper outputted by distributed printing with plural image forming apparatuses 20 are stacked together, there can be provided the following various controls of the print process: the control instructs each of the apparatuses to output an even number of set of paper sheets; the control causes an apparatus to print or display a message to instruct a stacking position or a rotation of sets of paper sheets when there is an apparatus to output an odd number of print sets; and the control causes an apparatus to insert a slip sheet for paper-shift correction into a stack of paper sheets when there is an apparatus to output an odd number of print sets. Thereby, the boundary of sets of paper sheets becomes definite and the object of a paper-shift function is achieved.

Hereinafter, operations under the situation to realize the above control by using distributed printing control apparatus 40 (distributed printing control program) of the present example will be described, with reference to flowcharts in FIGS. 19 to 27, FIG. 19 shows the total operations of distributed printing control apparatus 40. Each of FIGS. 20 to 27 shows detailed operations of an individual step in the flowchart of FIG. 19.

When distributed printing is instructed by an operator through one of client terminals 30 (S100: YES), distributed printing control apparatus 40 selects image forming apparatuses 20 to perform distributed printing from among plural image forming apparatuses connected to network 50 (S110; a detailed description will be provided later), and collects, from image forming apparatuses to perform distributed printing, information required for distributed printing, such as information relating to printing paper, information relating to an existence of a paper-shift function and a kind of the paper-shift function, and information relating to a previously submitted job (S120).

Next, distributed printing control apparatus 40 judges whether the apparatuses to perform distributed printing include image forming apparatus 20 with a paper-shift function or not (S130). When image forming apparatus 20 with a paper-shift function is included, distributed printing control apparatus 40 adjusts paper orientation when they include image forming apparatus with a paper-shift function (S140; a detailed description will be provided later), and defines the number of print sets distributed to each of image forming apparatuses 20 to perform distributed printing (S150; a detailed description will be provided later).

Then, distributed printing control apparatus 40 judges whether the distribution makes image forming apparatus 20 to output an odd number of print sets or not (S160). When there is provided image forming apparatus 20 to output an odd number of print sets, distributed printing control apparatus 40 adds an instruction to display "a warning message about stacking operations" of sets of outputted paper sheets, into a job corresponding to the image forming apparatus 20 (S170; a detailed description will be provided later).

Next, distributed punting control apparatus 40 judges whether there is image forming apparatus 20 which is expected to be affected in its paper shift direction by a previously submitted job or not (S180). When there is provided image forming apparatus 20 which is expected to be affected in its paper-shift direction by a previously submitted job, distributed printing control apparatus 40 adds instructions to "avoid the apparatus from being affected" to a job corresponding to the affected image forming apparatus 20 (S190; a detailed description will be provided later). After that, distributed printing control apparatus 40 sends jobs to respective image forming apparatuses 20 to perform distributed printing (S200; a detailed description will be provided later).

FIG. 20 shows processing flaw relating to selection of apparatuses to perform distributed printing in step S110 in FIG. 19. First, distributed printing control apparatus 40 searches image forming apparatuses 20 connected to network 50 as a working environment (S111). Next, distributed printing control apparatus 40 confirms existence of a setting, which has been instructed from an operator by using UI (user interface), to limit the selection to image forming apparatuses 20 with a paper-shift function (S112).

When the selection is not limited to image forming apparatuses 20 with a paper-shift function, distributed printing control apparatus 40 displays the search result in the operation and display section (S113) and receives input of selection of image forming apparatuses 20 (S114). On the other hand, when the selection is limited to image forming apparatuses 20 with a paper-shift function, distributed printing control apparatus 40 extracts only image farming apparatuses 20 with a paper-shift function from among searched image forming apparatuses 20 (S115). Distributed printing control apparatus 40 further displays, on the operation and display section, the extracted image forming apparatuses 20 classified into groups of the same paper-shift function (shifting to two positions, shifting to three positions, shifting in only one direction and shifting in opposite directions), and makes client terminals 30 display the extracted image forming apparatuses (S116). After that, distributed printing control apparatus 40 receives input of selection of image forming apparatuses 20 within one of the groups of the same paper-shift function (S117). As described above, receiving selection input within one of the groups of the same paper-shift function, provides outputs of paper-shift ejection in an uniform appearance and prevents an occurrence of trouble which can be caused when sets of paper sheets are stacked together, before it happens.

Finally, distributed printing control apparatus 40 defines image forming apparatuses 20 to perform distributed printing and terminates the selection of apparatuses to perform distributed printing (S118).

FIG. 21 shows processing flow relating to adjusting paper orientation of step S140 in FIG. 19. First, distributed printing control apparatus 40 analyzes a job to be executed and acquires information of paper size (S141). Distributed printing control apparatus 40 further acquires paper information (about size and orientation) supported by respective image forming apparatuses 20 to perform distributed printing out of information collected in step S120 in FIG. 19 (S142).

Next, distributed printing control apparatus 40 judges whether the apparatuses to perform distributed printing include an apparatus handling printing paper in a limited orientation (S143). When such the apparatus is included, distributed printing control apparatus 40 adjusts paper orientation of the job to the paper orientation of the apparatus with the limitation (S144). For example, under the situation that apparatus A can handle only A4-SEF paper and apparatus B can handle both of A4-SEF paper and A4-LEF paper, distributed printing control apparatus 40 adjusts paper orientation of the job to A4-SEF. Alternatively, under the situation that apparatus A can handle only A4-LEF paper and apparatus B can handle both of A4-SEF paper and A4-LEF paper, distributed printing control apparatus 40 adjusts paper orientation of the job to A4-LEF.

Next, distributed printing control apparatus 40 judges whether the apparatuses to perform distributed printing include an apparatus to shift paper sheets in a limited direction (which can shift paper sheets in only one direction) or not (S145). When such the apparatus is included, distributed printing control apparatus 40 adjusts the paper-shift direction of the job to the paper-shift direction of the apparatus with the limitation (S146). For example, under the condition that apparatus A is capable of shifting paper sheets in only one direction and apparatus B is capable of shifting paper sheets in opposite directions, distributed printing control apparatus 40 adjusts the paper-shift direction of the job to the paper-shift direction of apparatus A.

FIG. 22 shows processing flow relating to distributing the number of print sets of step S150 in FIG. 19. First, distributed printing control apparatus 40 judges whether the total number of print sets instructed in the job to be executed is an odd number or an even number (S151). When the total number of print sets is odd (where the total number of print sets is assumed to be two times the number of apparatuses minus one, or more), distributed printing control apparatus 40 distributes an odd number of print sets only to one image forming apparatus 20 and distributes an even number of print sets to each of the other image forming apparatuses 20 (S152). On the other hand, when the total number of the print sets is even (where the total number of print sets is assumed to be two times the number of apparatuses, or more), distributed printing control apparatus 40 distributes an even number of print sets to each image forming apparatuses 20 (S153).

The above flow provides the control under the condition that distributed printing control apparatus 40 adjusts paper orientation of all the image forming apparatuses 20 to perform distributed printing to be uniform in steps S145 and S146 in FIG. 21. However, under the condition that distributed printing control apparatus 40 does not adjust paper orientation of all the image forming apparatuses 20 to be uniform, distributed printing control apparatus 40 distributes the number of print sets in consideration of the paper-shift direction of each image forming apparatus 20. Herein, an example under the condition that there are two image forming apparatuses 20 (apparatus A and apparatus B) to perform distributed printing, apparatus A shifts paper sheets in the right-hand side and apparatus B shifts paper sheets in the left-hand side, is considered. When the total number of print sets instructed in a job is an odd number, distributed printing control apparatus 40 may distribute an odd number of print sets to image forming apparatus 20 to output sets of paper sheets to be placed downward of a stack, and distribute an even number of print sets for image forming apparatus 20 to output print sets of paper sheets to be stacked on the former print sets. When the total number of print sets instructed in the job is an even number, distributed printing control apparatus 40 may distribute an odd number of print sets to each of two image forming apparatuses.

Each of FIGS. 23 and 24 shows processing flow relating to an example of instruction to output a warning message about stacking operations in step S170 in FIG. 19. In FIG. 23, distributed printing control apparatus 40 adds information for instructing to cause image forming apparatus 20 performing printing of an odd number of print sets to display a warning message as shown in FIG. 16, into a job (S171). In FIG. 24, distributed printing control apparatus 40 adds information for instructing to cause image forming apparatus 20 performing printing of an odd number of print sets to print a warning message sheet as shown in FIG. 17, into a job (S172).

Each of FIGS. 25 and 26 shows processing flow relating to an example of instruction to avoid an apparatus from being affected by a previously submitted job. In FIG. 25, distributed printing control apparatus 40 adds information for instructing to cause image forming apparatus 20 which is expected to be affected by a previously submitted job to rotate images through 180 degrees (S191). Next, distributed printing control apparatus 40 judges whether a setting to print a message sheet as shown in FIG. 18 has been provided previously by a user interface (S192), and adds information for instructing to print a warning message about stacking operations to a job if such the setting has been provided (S193). In FIG. 26, distributed printing control apparatus 40 adds information for instructing to print a slip sheet for paper-shift correction, which instructs to output a slip sheet for correcting a paper-shift position before outputs of the current job are ejected, to a job corresponding to the image forming apparatus 20 which is expected to be affected by a previously submitted job (S194).

FIG. 27 shows processing flow relating to performing distributed printing of step S200 in FIG. 19. First, distributed printing control apparatus 40 acquires definite information of image forming apparatuses 20 to perform distributed printing (S201), and adds definite information of paper size and paper orientation to a job to be transmitted to each image forming apparatus 20 (S202). Next, distributed printing control apparatus 40 adds definite information of the number of print sets defined to each image forming apparatus 20 to each job (S203) and adds information for instructing to output a warning message about stacking operations and information for instructing to avoid an apparatus from being affected by a previously submitted job to a job corresponding to each of image forming apparatus 20 requiring such the kinds of information (S204, S205). When jobs and additional information for individual image forming apparatuses are completed, distributed printing control apparatus 40 sends the jobs to respective image forming apparatuses 20 to perform distributed printing (S206).

Accordingly, distributed printing control apparatus 40 (distributed printing control program) of the present example adjusts paper orientation of plural image forming apparatuses 20 to perform distributed printing to be uniform. Further, distributed printing control apparatus 40 (distributed printing control program) of the present example causes each image forming apparatus 20, excluding that to output print sets to be put on the top of the other sets, to print an even number of print sets, when the total number of print sets are an odd number; and causes each image forming apparatus 20 to print an even number of print sets, when the total number of print sets are an even number. Thereby, even when plural sets of paper sheets are stacked together without their paper orientation changed, irregular paper projection does not appear in the stack and the boundary of print sets can be definite.

When there appears image forming apparatus 20 to output an odd number of sets of paper sheets, the image forming apparatus 20 can print images which is rotated through 180 degrees or insert a slip sheet for paper shift correction, to make the boundary of the sets definite. Under the condition that sets of paper sheets are required to be stacked with considering the stacking order, the image forming apparatus 20 displays a warning message or prints a message sheet, which allows an operator to stack the plural sets of paper sheets so as to make the boundary of the sets definite.

While the present example of the present invention have been described using specific terms, such description is for illustrative purpose only, and it is to be understood that changes and variations may be made without depending from the spirit or scope of the appended claims.

For example, in the above example, there was described an example that distributed printing control apparatus 40 exists as an independent server. However, a function of distributed printing control apparatus 40 may exists inside any one of client terminals 30 and image forming apparatuses 20.

Further, in the present example, there was provided a situation to process a print job generated in client terminal 30. However, the control method of the present example can be applied similarly to the situation to process a copy job generated in image forming apparatus 20.

In the present example, multi function peripherals were used. However, the control method of the present example can be applied similarly to printers and other devices as far as they perform image formation.

The invention claimed is:

1. A non-transitory computer readable storage medium storing therein a distributed printing control program executed in a system to perform distributed printing by outputting a specified number of sets of paper sheets by using a plurality of image forming apparatuses, the number of the sets being instructed by a job, the program causing an apparatus belonging to the system to function as a control section, wherein the control section judges whether the number of sets instructed by the job is an odd number or an even number;

divides the job into a plurality of jobs based on a result of the judgment, each of the jobs causing one of the image forming apparatuses to eject a plurality of sets of paper sheets shifted in alternate directions such that, when sets of paper sheets ejected by the plurality of image forming apparatuses are stacked up together, all the sets of paper sheets are shifted in alternate directions to enable each of the sets to be separated from others; and subjects the divided jobs to the plurality of image forming apparatuses.

2. The non-transitory computer readable storage medium of claim 1, wherein the plurality of image forming apparatuses are the same in paper orientation and in paper-shift direction to each other, and the control section divides the number of sets instructed by the job so as to distribute an even number of sets of paper sheets to each of the plurality of image forming apparatuses, when the number of sets instructed by the job is judged to be an even number.

3. The non-transitory computer readable storage medium of claim 1, wherein the plurality of image forming apparatuses are the same in paper orientation and in paper-shift direction to each other, and the control section divides the number of sets instructed by the job so as to distribute an odd number of sets of paper sheets to one of the plurality of image forming apparatuses, and to distribute an even number of sets of paper sheets to each of the other image forming apparatuses, when the number of sets instructed by the job is judged to be an odd number.

4. The non-transitory computer readable storage medium of claim 3, wherein, when the one of the plurality of image forming apparatuses is configured to output paper sheets with printed sides of the paper sheets facing up, the control section instructs the one of the plurality of image forming apparatuses to display or print a message to put sets of paper sheets ejected by the one of the plurality of image forming apparatuses on top of a group of sets of paper sheets prepared by stacking sets of paper sheets ejected by the other image forming apparatuses together, and when the one of the plurality of image forming apparatuses is configured to output paper sheets with printed sides of the paper sheets facing down, the control section instructs the one of the plurality of image forming apparatuses to display or print a message to put sets of paper sheets ejected by the one of the plurality of image forming apparatuses at a bottom of a group of sets of paper sheets prepared by stacking sets of paper sheets ejected by the other image forming apparatuses together.

5. The non-transitory computer readable storage medium of claim 4, wherein the control section instructs the one of the plurality of image forming apparatuses to output a sheet on which the message is printed as a cover sheet, at a shift position which is the same as a shift position of a first-printed set of paper sheets of the one of the plurality of image forming apparatuses, to put the sheet on the first-printed set.

6. The non-transitory computer readable storage medium of claim 1, wherein under a condition that one of the plurality of image forming apparatuses has a previously submitted job and the one of the plurality of image forming apparatuses outputs a first-printed set of distributed printing at a shift-position which changes depending on an existence of the previously submitted job, the control section instructs the one of the plurality of image forming apparatuses to rotate an output image of the distributed printing through 180 degrees.

7. The non-transitory computer readable storage medium of claim 6, wherein the control system instructs the one of the plurality of image forming apparatuses to print a cover sheet informing that an outputted image has been rotated through 180 degrees.

8. The non-transitory computer readable storage medium of claim 1, wherein under a condition that one of the plurality of image forming apparatuses has a previously submitted job and the one of the plurality of image forming apparatuses outputs a first-printed set of distributed printing at a shift-position which changes depending on an existence of the previously submitted job, the control section instructs the one of the plurality of image forming apparatuses to insert a slip sheet between a last-printed set of the previously submitted job and a first-printed set of the job of distributed printing.

9. The non-transitory computer readable storage medium of claim 1, wherein the plurality of image forming apparatuses are three or more the image forming apparatuses, and the control section divides the number of sets instructed by the job so as to distribute an odd number of sets of paper sheets to one of the plurality of image forming apparatuses, and to distribute an even number of sets of paper sheets to each of the other image forming apparatuses, when the number of sets instructed by the job is judged to be an odd number.

10. The non-transitory computer readable storage medium of claim 1, wherein the plurality of image forming apparatuses are three or more of the image forming apparatuses, and the control section divides the number of sets instructed by the job so as to distribute an even number of sets of paper sheets to each of the plurality of image forming apparatuses, when the number of sets instructed by the job is judged to be an even number.

11. The non-transitory computer readable storage medium of claim 4, wherein, when the one of the plurality of image forming apparatuses is configured to output paper sheets with printed sides of the paper sheets facing up, the control section instructs the one of the plurality of image forming apparatuses to eject a sheet on which the message has been printed, on the sets of paper sheets ejected by the one of the plurality of image forming apparatuses, and when the one of the plurality of image forming apparatuses is configured to output paper sheets with printed sides of the paper sheets facing down, the control section instructs the one of the plurality of image forming apparatuses to eject a sheet of paper on which the message has been printed, under the sets of paper sheets ejected by the one of the plurality of image forming apparatuses.

12. A non-transitory computer readable storage medium storing therein a distributed printing control program executed in a system to perform distributed printing by outputting a specified number of sets of paper sheets by using a plurality of image forming apparatuses, the number of the sets being instructed by a job, the program causing an apparatus belonging to the system to function as a control section, wherein the control section divides the job into a plurality of jobs, each of the jobs causing one of the image forming apparatuses to eject a plurality of sets of paper sheets shifted in alternate directions such that, when sets of paper sheets ejected by the plurality of image forming apparatuses are stacked up together, all the sets of paper sheets are shifted in alternate directions to enable each of the sets to be separated from others; and subjects the divided jobs to the plurality of image forming apparatuses, wherein the plurality of image forming apparatuses are the same in paper orientation and in paper-shift direction to each other, and the control section divides the total number of sets of paper sheets so as to distribute an odd number of sets of paper sheets to one of the plurality of image forming apparatuses, and to distribute an even number of sets of paper sheets to each of the other image forming apparatuses, when the total number of the sets instructed by the job is an odd number, and wherein, when the one of the plurality of image forming apparatuses is configured to output paper sheets with printed sides of the paper sheets facing up, the control section instructs the one of the plurality of image forming apparatuses to display or print a message to put sets of paper sheets ejected by the one of the plurality of image forming apparatuses on top of a group of sets of paper sheets prepared by stacking sets of paper sheets ejected by the other image forming apparatuses together, and when the one of the plurality of image forming apparatuses is configured to output paper sheets with printed sides of the paper sheets facing down, the control section instructs the one of the plurality of image forming apparatuses to display or print a message to put sets of paper sheets ejected by the one of the plurality of image forming apparatuses at a bottom of a group of sets of paper sheets prepared by stacking sets of paper sheets ejected by the other image forming apparatuses together.

13. The non-transitory computer readable storage medium of claim 12, wherein the control section instructs the one of the plurality of image forming apparatuses to output a sheet on which the message is printed as a cover sheet, at a shift position which is the same as a shift position of a first-printed set of paper sheets of the one of the plurality of image forming apparatuses, to put the sheet on the first-printed set.

14. An apparatus belonging to a system to perform distributed printing by outputting a specified number of sets of paper sheets by using a plurality of image forming apparatuses, the number of the sets being instructed by a job, the apparatus comprising a processor configured to judge whether the number of sets instructed by the job is an odd number or an even number;

divide the job into a plurality of jobs based on a result of the judgment, each of the jobs causing one of the image forming apparatuses to eject a plurality of sets of paper sheets shifted in alternate directions such that, when sets of paper sheets ejected by the plurality of image forming apparatuses are stacked up together, all the sets of paper sheets are shifted in alternate directions to enable each of the sets to be separated from others; and subject the divided jobs to the plurality of image forming apparatuses.

15. The apparatus of claim 14, wherein the processor is configured to divide the number of sets instructed by the job so as to distribute an even number of sets of paper sheets to each of the plurality of image forming apparatuses, when the number of sets instructed by the job is judged to be an even number.

16. The apparatus of claim 14, wherein the processor is configured to divide the number of sets instructed by the job so as to distribute an odd number of sets of paper sheets to one of the plurality of image forming apparatuses, and to distribute an even number of sets of paper sheets to each of the other image forming apparatuses, when the number of sets instructed by the job is judged to be an odd number.

17. The apparatus of claim 14, wherein, when the one of the plurality of image forming apparatuses is configured to output paper sheets with printed sides of the paper sheets facing up, the processor is configured to instruct the one of the plurality of image forming apparatuses to display or print a message to put sets of paper sheets ejected by the one of the plurality of image forming apparatuses on top of a group of sets of paper sheets prepared by stacking sets of paper sheets ejected by the other image forming apparatuses together, and when the one of the plurality of image forming apparatuses is configured to output paper sheets with printed sides of the paper sheets facing down, the processor is configured to instruct the one of the plurality of image forming apparatuses to display or print a message to put sets of paper sheets ejected by the one of the plurality of image forming apparatuses at a bottom of a group of sets of paper sheets prepared by stacking sets of paper sheets ejected by the other image forming apparatuses together.

18. The apparatus of claim 17, wherein the processor is configured to instruct the one of the plurality of image forming apparatuses to output a sheet on which the message is printed as a cover sheet, at a shift position which is the same as a shift position of a first-printed set of paper sheets of the one of the plurality of image forming apparatuses, to put the sheet on the first-printed set.

19. The apparatus of claim 14, wherein under a condition that one of the plurality of image forming apparatuses has a previously submitted job and the one of the plurality of image forming apparatuses outputs a first-printed set of distributed printing at a shift-position which changes depending on an existence of the previously submitted job, the processor is configured to instruct the one of the plurality of image forming apparatuses to rotate an output image of the distributed printing through 180 degrees.

20. The apparatus of claim 19, wherein the processor is configured to instruct the one of the plurality of image forming apparatuses to print a cover sheet informing that an outputted image has been rotated through 180 degrees.

21. The apparatus of claim 14, wherein under a condition that one of the plurality of image forming apparatuses has a previously submitted job and the one of the plurality of image forming apparatuses outputs a first-printed set of distributed printing at a shift-position which changes depending on an existence of the previously submitted job, the processor is configured to instruct the one of the plurality of image forming apparatuses to insert a slip sheet between a last-printed set of the previously submitted job and a first-printed set of the job of distributed printing.

* * * * *